United States Patent
Roberts et al.

(10) Patent No.: US 11,614,152 B2
(45) Date of Patent: Mar. 28, 2023

(54) LOCKING DIFFERENTIAL

(71) Applicants: Anthony David Roberts, Bungador (AU); David John Roberts, Colac (AU)

(72) Inventors: Anthony David Roberts, Bungador (AU); David John Roberts, Colac (AU)

(*) Notice: Subject to any disclaimer, the term of this patent is extended or adjusted under 35 U.S.C. 154(b) by 97 days.

(21) Appl. No.: 16/644,660

(22) PCT Filed: Sep. 7, 2018

(86) PCT No.: PCT/AU2018/050972
§ 371 (c)(1),
(2) Date: Mar. 5, 2020

(87) PCT Pub. No.: WO2019/046902
PCT Pub. Date: Mar. 14, 2019

(65) Prior Publication Data
US 2022/0178433 A1     Jun. 9, 2022

(30) Foreign Application Priority Data

Sep. 8, 2017  (AU) ................................ 2017903638

(51) Int. Cl.
*F16H 48/24*  (2006.01)
*F16H 48/08*  (2006.01)
*F16H 48/32*  (2012.01)

(52) U.S. Cl.
CPC .............. *F16H 48/24* (2013.01); *F16H 48/08* (2013.01); *F16H 48/32* (2013.01); *F16H 2048/085* (2013.01); *F16H 2048/087* (2013.01)

(58) Field of Classification Search
CPC .......... F16H 48/24; F16H 48/08; F16H 48/32; F16H 2048/085; F16H 2048/087
See application file for complete search history.

(56) References Cited

U.S. PATENT DOCUMENTS 1,341,276 A * 5/1920 Macdonald ............. F16H 48/08
                                                    475/233
1,458,877 A * 6/1923 Dair ........................ F16H 48/24
                                                    475/237

(Continued)

FOREIGN PATENT DOCUMENTS

CN        104896053 A        9/2015
DE        19858033 A1 *      6/2000   ............. B60K 17/20

(Continued)

OTHER PUBLICATIONS

International Search Report (3 pages) dated Oct. 4, 2018 from corresponding PCT Application No. PCT/AU2018/050972.

(Continued)

*Primary Examiner* — Sherry L Estremsky
(74) *Attorney, Agent, or Firm* — Crowell & Moring LLP; John C. Freeman

(57) ABSTRACT

The description is directed broadly to a locking differential, comprising; a pair of rotating bevel gears engaged with one another via at least one pinion gear rotatably supported within a carrier; a locking member disposed within the carrier and engagable with each of the bevel gears, the locking member being movable between a locked configuration and an unlocked configuration, such that in the unlocked configuration the locking member allows free rotation of the bevel gears in engagement with the at least one pinion gear to equalise torque between a first bevel gear and a second bevel gear of the pair, and in the locked configuration the locking member locks the first bevel gear to the carrier and locks the second bevel gear to the carrier, simultaneously, to prevent relative movement therebetween.

19 Claims, 21 Drawing Sheets

(56) References Cited

U.S. PATENT DOCUMENTS

| | | | | |
|---|---|---|---|---|
| 1,466,778 | A * | 9/1923 | Woods | F16H 48/295 |
| | | | | 475/237 |
| 1,484,466 | A * | 2/1924 | Boydelatour | F16H 48/08 |
| | | | | 475/233 |
| 4,759,232 | A * | 7/1988 | Roberts | F16H 48/08 |
| | | | | 475/86 |
| 4,919,008 | A * | 4/1990 | Goscenski, Jr. | F16H 48/22 |
| | | | | 475/234 |
| 4,976,667 | A * | 12/1990 | Goscenski, Jr. | F16H 48/34 |
| | | | | 475/86 |
| 5,465,819 | A | 11/1995 | Weilant et al. | |
| 5,591,098 | A * | 1/1997 | Jones | F16H 48/30 |
| | | | | 475/233 |
| 5,637,049 | A * | 6/1997 | Zentmyer | B60K 17/20 |
| | | | | 192/49 |
| 5,947,859 | A * | 9/1999 | McNamara | F16H 48/08 |
| | | | | 425/231 |
| 9,657,827 | B2 | 5/2017 | Gopal et al. | |
| 9,878,615 | B2 * | 1/2018 | Kamitani | F16D 27/118 |
| 2008/0242469 | A1 | 10/2008 | Jenski et al. | |
| 2015/0107933 | A1 | 4/2015 | Gopal et al. | |
| 2018/0149252 | A1 | 5/2018 | Roberts | |

FOREIGN PATENT DOCUMENTS

| | | |
|---|---|---|
| GB | 726227 A | 3/1955 |
| GB | 2286435 A | 8/1995 |
| WO | WO 2015/060890 A1 | 4/2015 |
| WO | WO 2016/176737 A1 | 11/2016 |

OTHER PUBLICATIONS

Written Opinion (6 pages) dated Oct. 4, 2018 from corresponding PCT Application No. PCT/AU2018/050972.
Extended European Search Report dated Feb. 3, 2021 from corresponding European Application No. 18853998.5 (10 pages) including English translation.

* cited by examiner

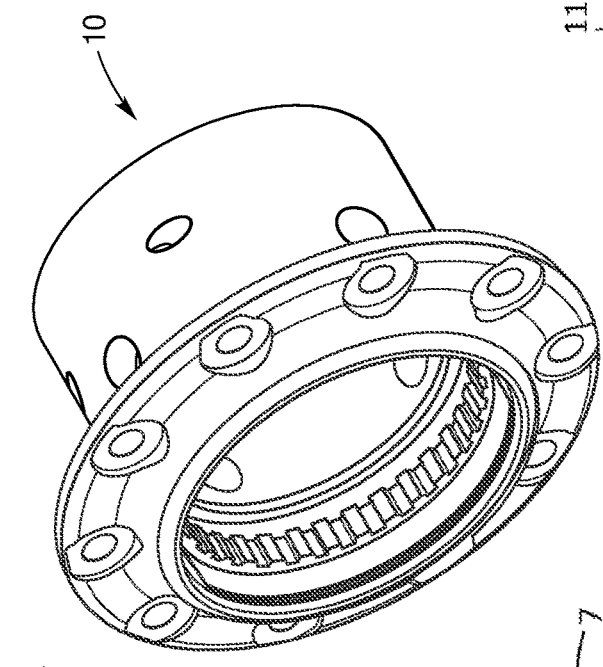
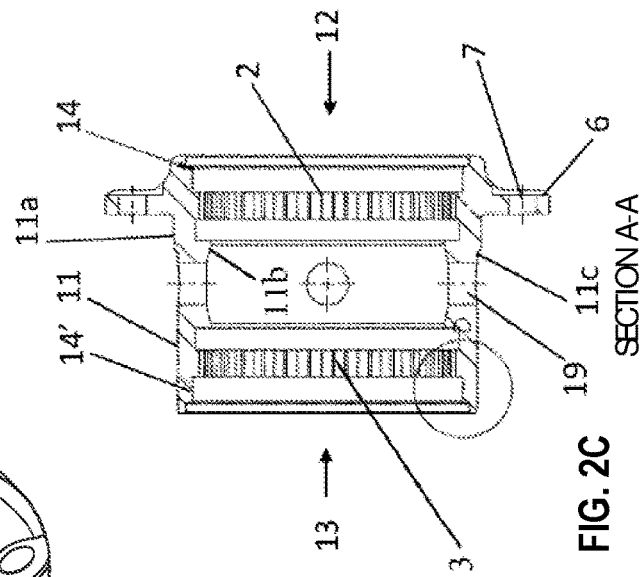
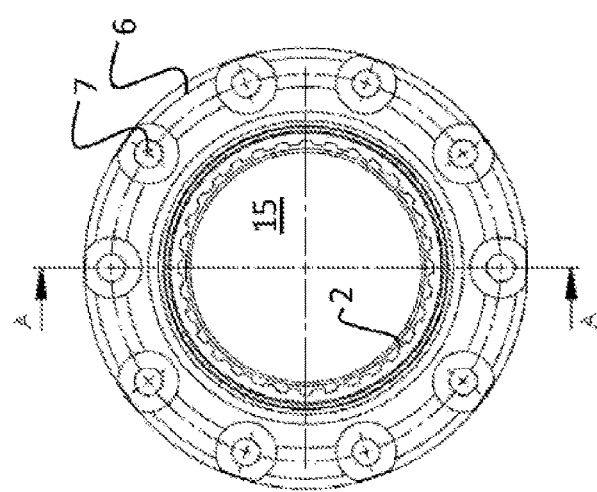

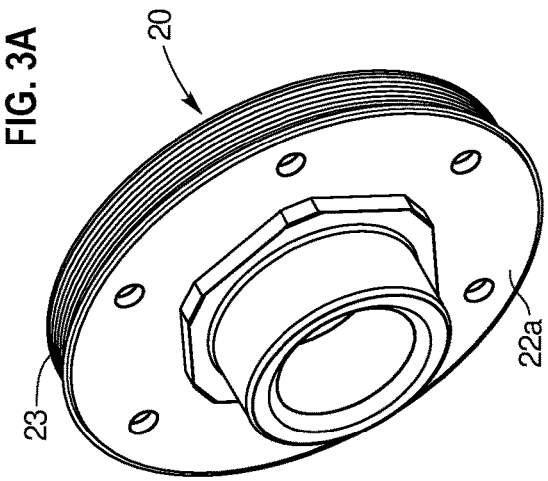
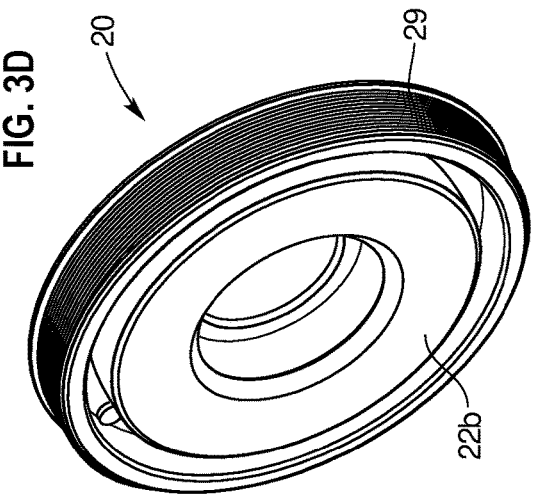
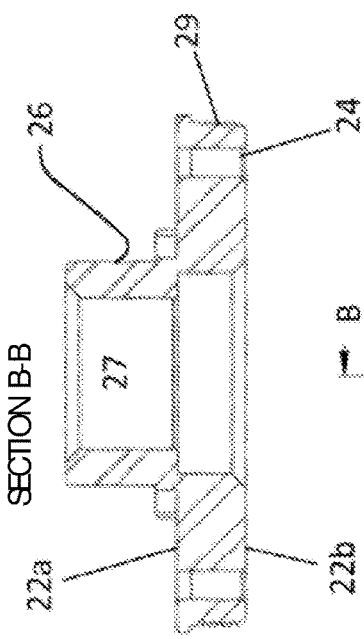
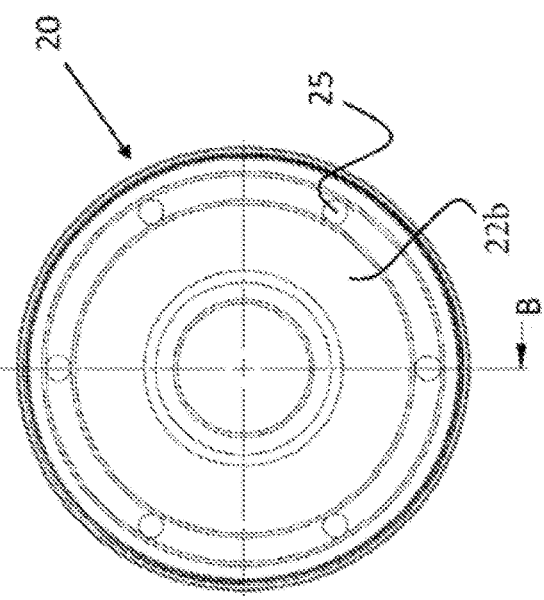

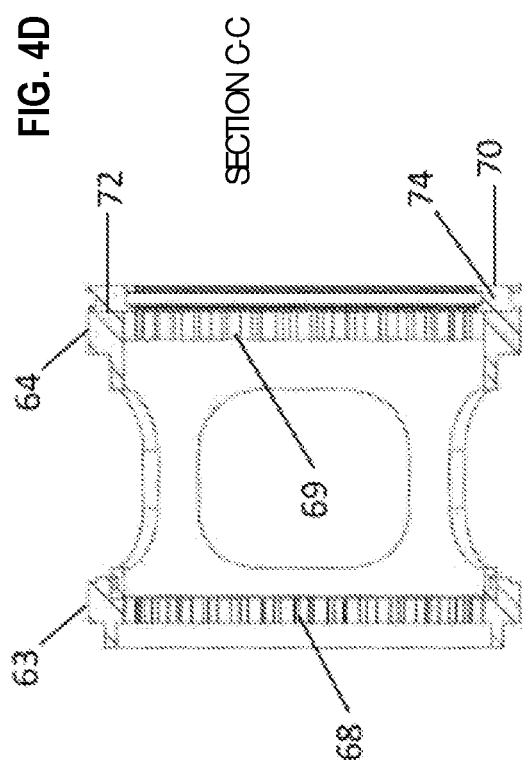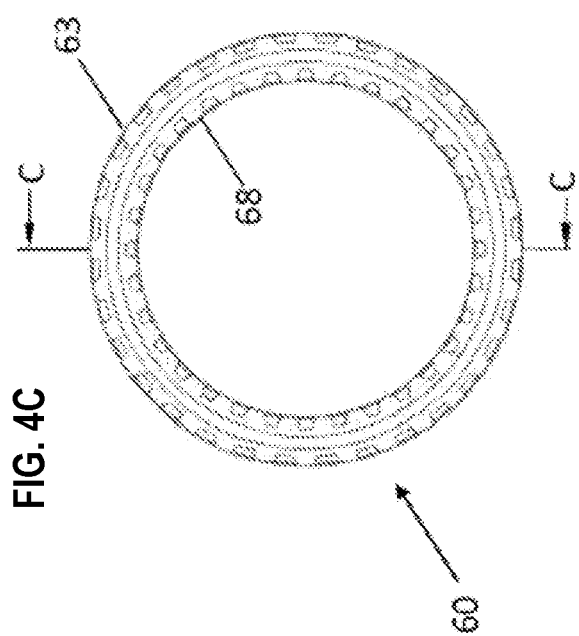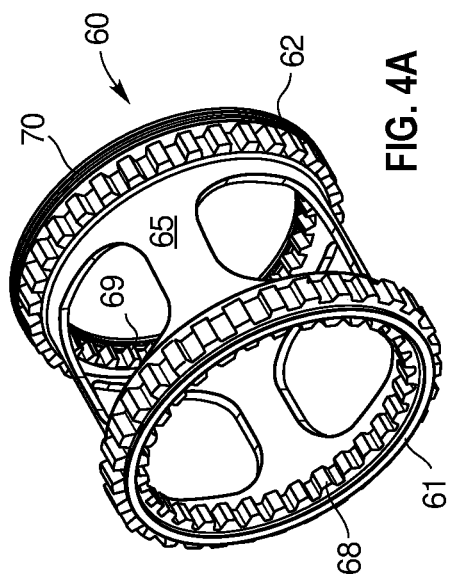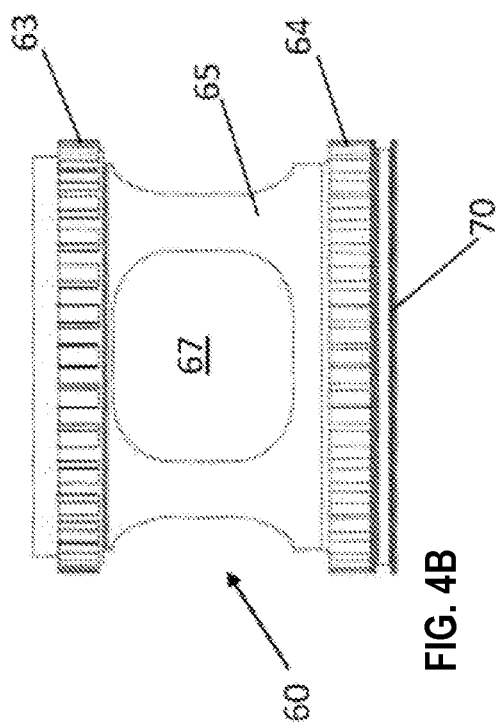

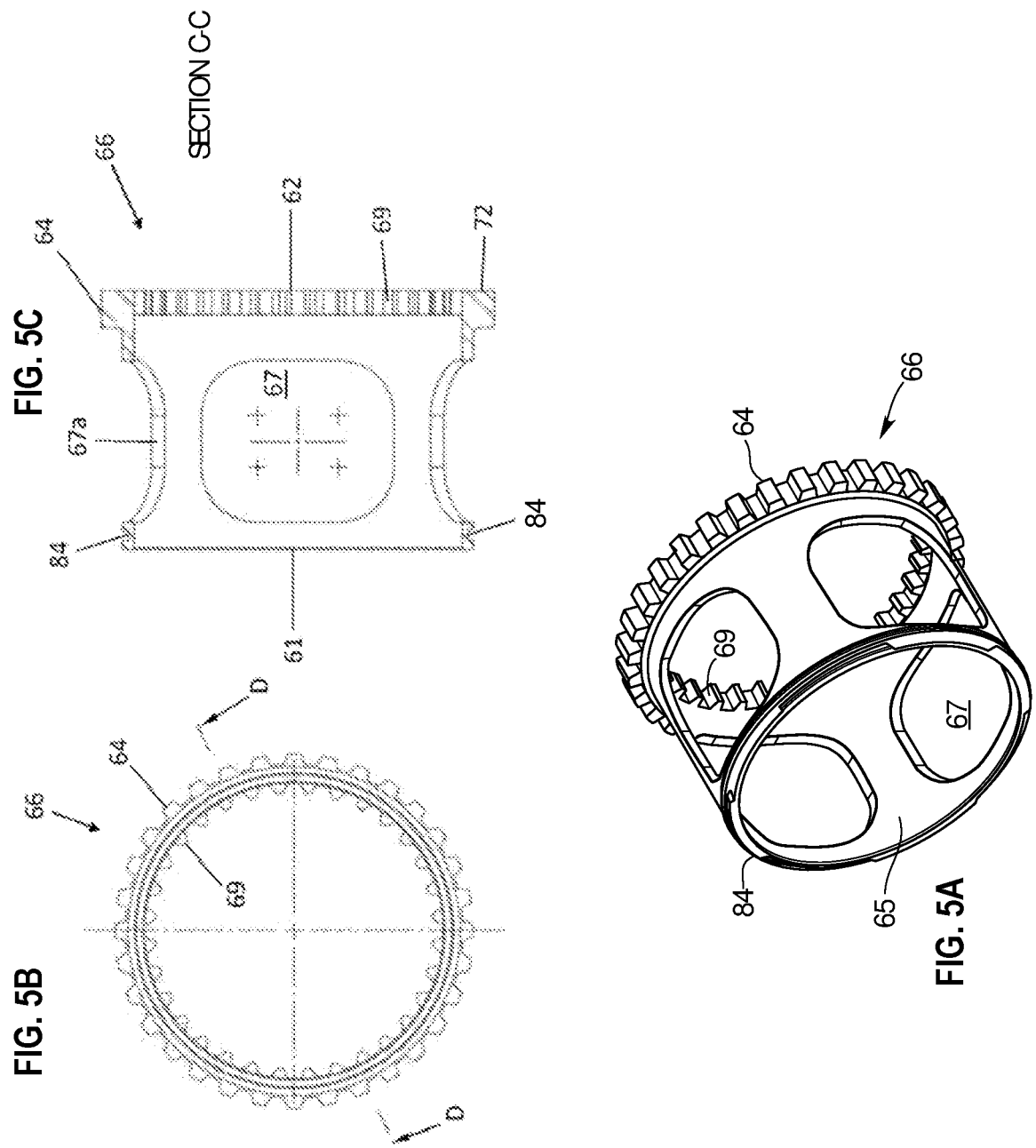

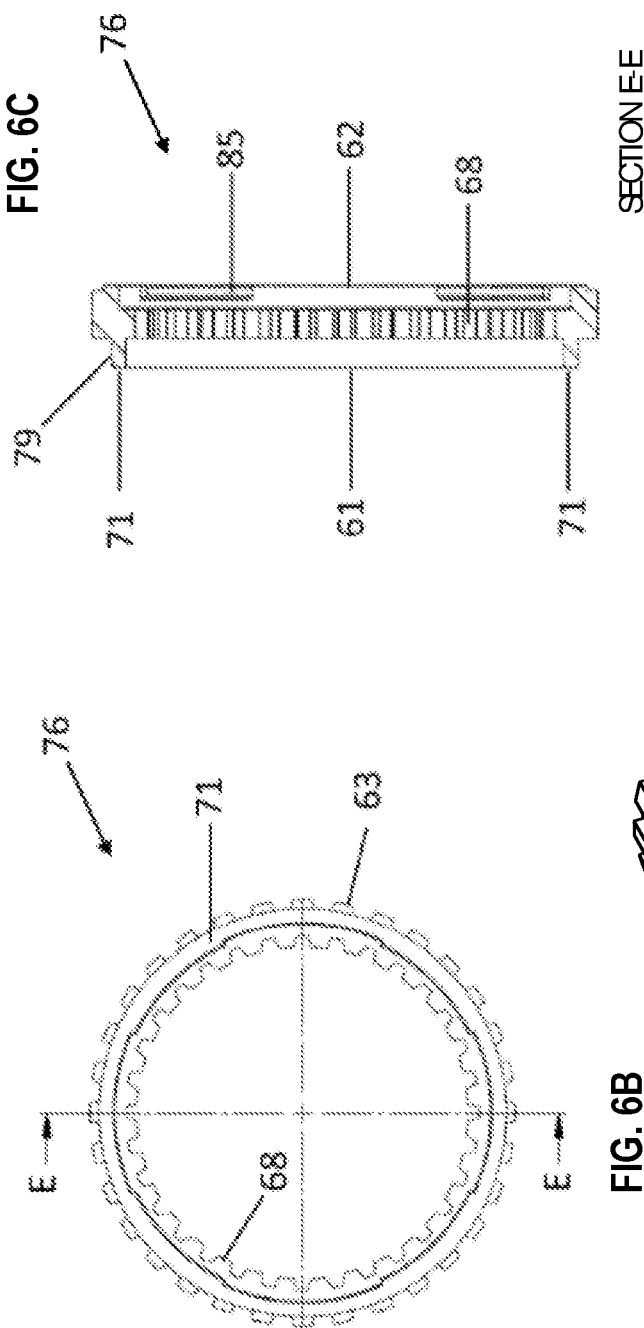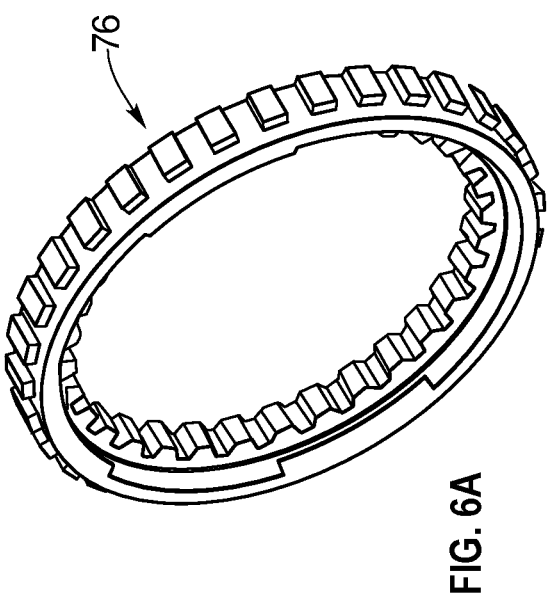

SECTION G-G

SCALE 1:1

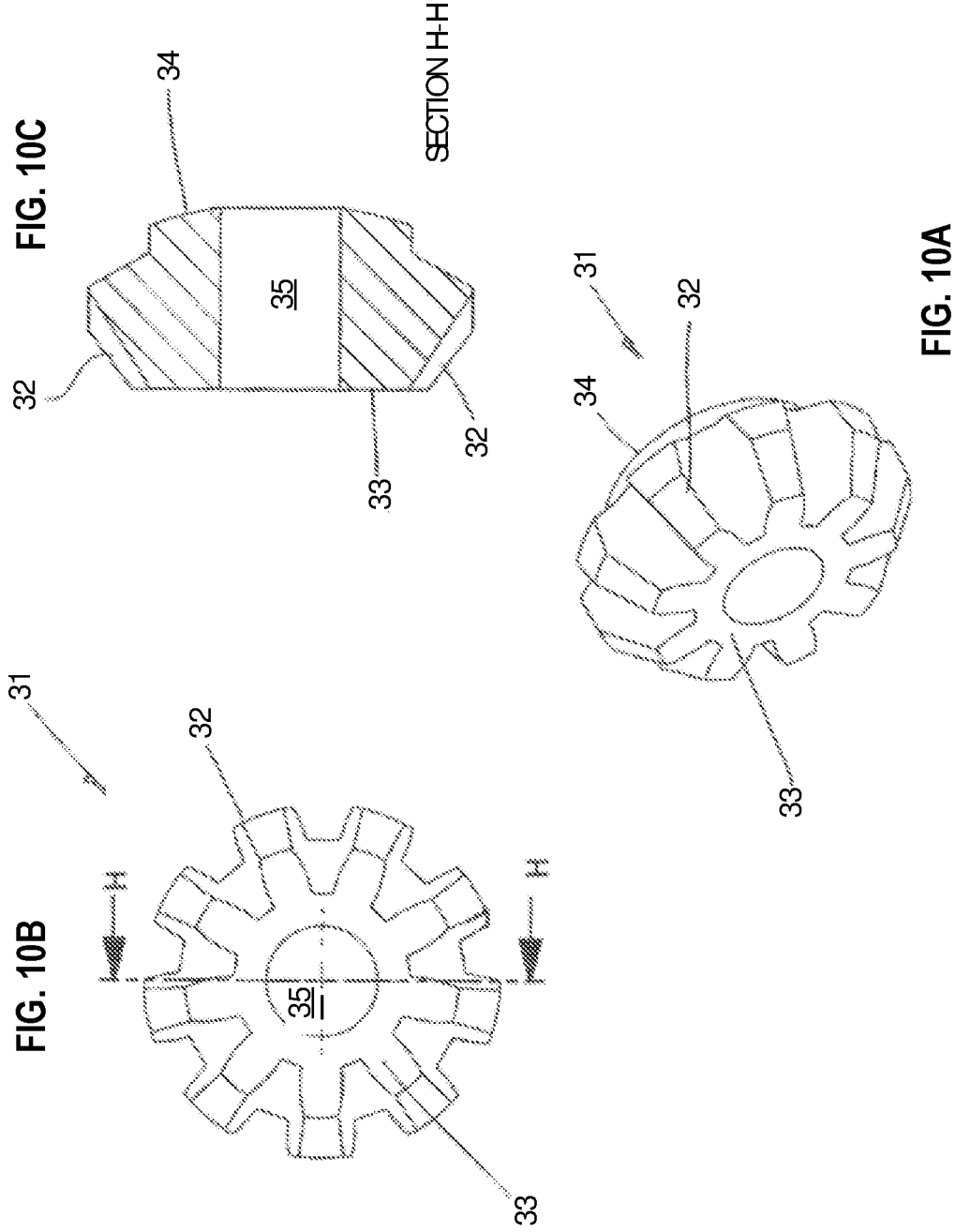

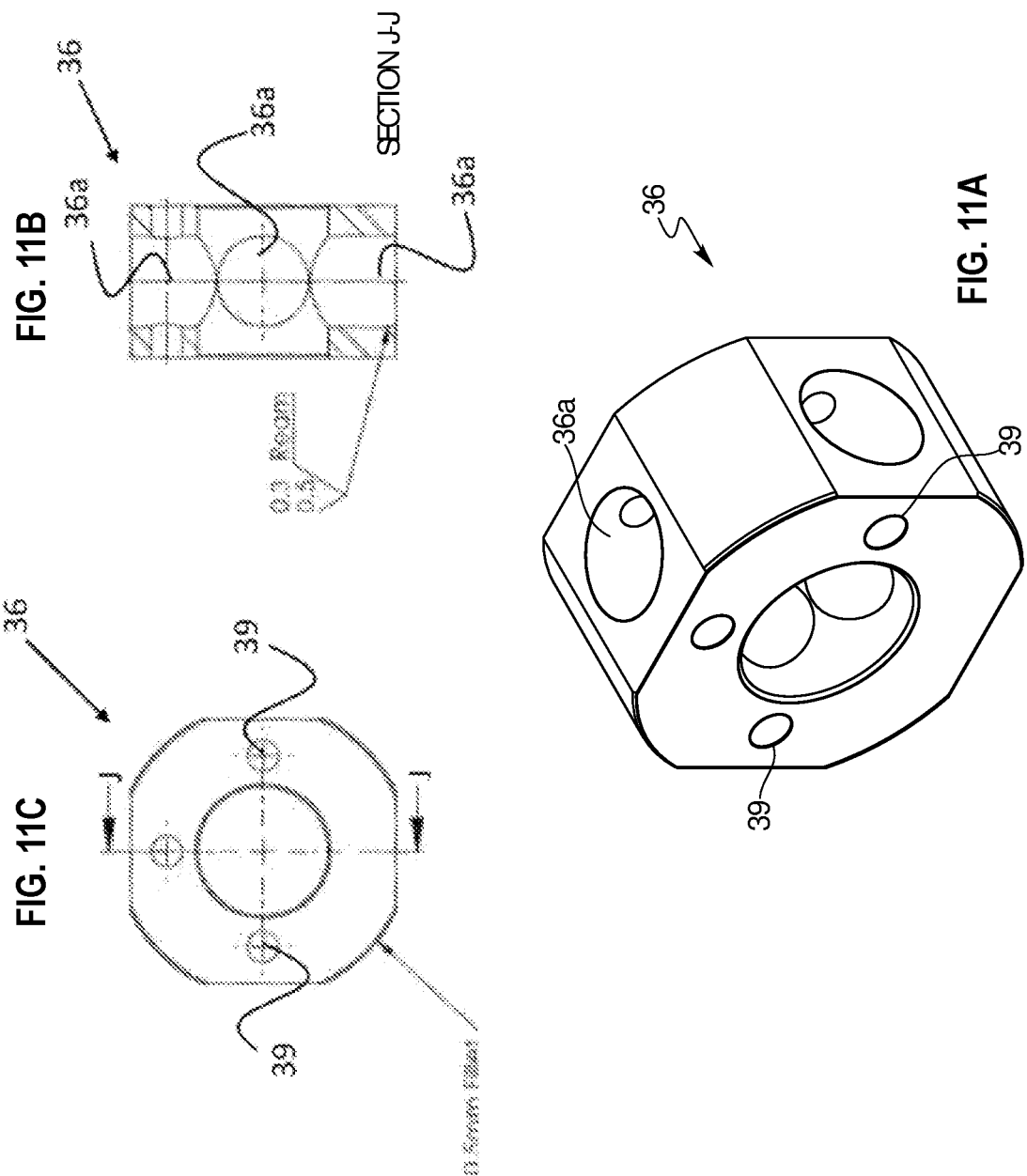

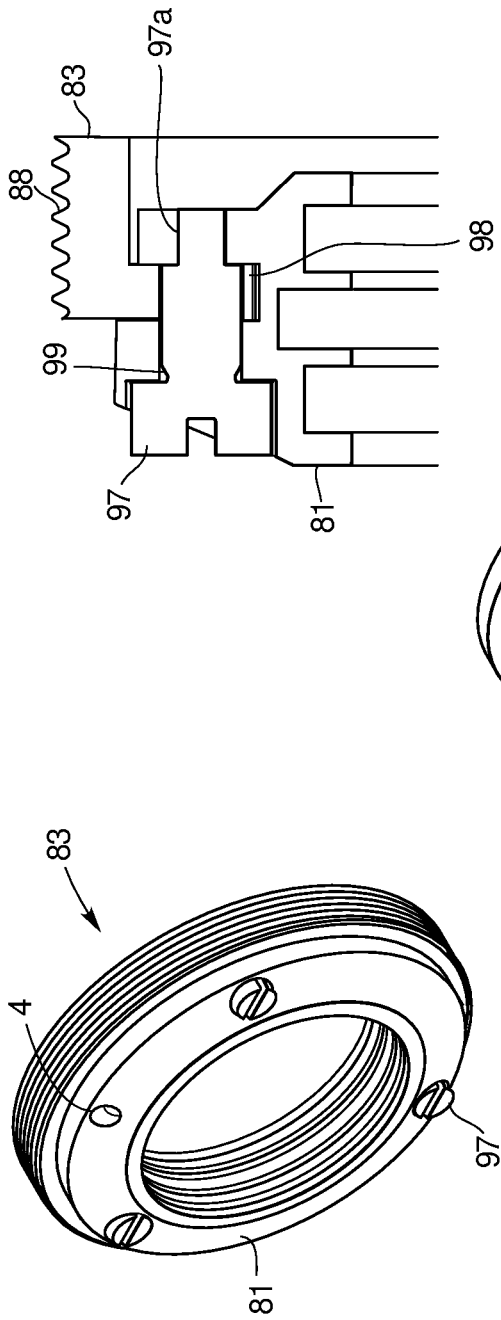

LOCKING DIFFERENTIAL

This application is a National Stage application of International Application No. PCT/AU2018/050972, filed Sep. 7, 2018, the entire contents of which are incorporated herein by reference.

This application claims priority under 35 U.S.C. § 119(a) to Australian Patent Application No. 2017903638, filed on Sep. 8, 2017, the entire contents of which are incorporated herein by reference.

TECHNICAL FIELD

The invention relates to the field of differential gearing, for use in distributing torque in vehicles and other machines. Specifically, the invention relates to a differential for a motor vehicle that can be locked to adjust the working characteristics of the differential during use of the motor vehicle or other machine.

BACKGROUND

A differential is used to distribute torque between two interconnected rotating shafts. A specific, everyday use of a differential is on a motor vehicle where a left and a right axle of the vehicle are rotatably connected via a differential located between the axles.

When a vehicle turns a corner the outer wheels of the vehicle must travel further than the wheels on the inner side of the vehicle, as the turning arc is longer farthest from a turning centre. To accommodate this turning requirement, the outer wheels of a vehicle are accelerated proportionally to the inner wheels being decelerated, thereby allowing the vehicle to turn a corner whilst maintaining all four wheels in rolling contact with a road surface. The differential is the gearing unit that proportionally increases the speed of the outer wheel and decreases the speed of the inner wheel by distributing torque between the axle of the outer wheel and the axle of the inner wheel.

Without a differential, the mismatched wheel speeds will result in poor, unpredictable handling characteristics of the vehicle, loss of traction, and tyre damage. Although a road vehicle relies on the differential to maintain good handling and control for on road driving, there are times when a vehicle is driven off-road or when the road conditions become poor, such that the equalising of torque between the two interconnected wheels is not desirable. For example, when the road becomes icy, and one or more of the wheels of the vehicle lose traction.

An open differential distributes torque equally to the inner and the outer wheel. The torque applied is limited by the maximum traction between the wheel and surface it is contacting. If one wheel is sitting on ice, the friction of the surface is very low, thus significantly dropping the traction of that wheel. In response to the low traction the torque sent to that wheel is greatly reduced. This torque limitation is applied to both wheels, as the open differential splits torque evenly, thus the amount of torque distributed to both wheels is limited by the traction threshold of the ice-bound spinning wheel. Leaving the vehicle stuck until the friction under the spinning wheel increases.

To counter the above scenario some differentials can be partially or fully locked. Partially locked differential being referred to as "limited-slip differentials" and locked differentials often referred to as "lockers". This "locking" can partially or totally remove the equalising of the torque distributed between the two axles. As such, if one wheel has lost traction and is spinning, the torque from the engine will be delivered to the non-spinning wheel removing the limitation of the open differential. The wheel that has traction receives an unlimited torque to propel the vehicle forward (or rearward) and remedy the loss of traction on the other spinning wheel.

The effect of a locked differential can be achieved with a continuous axle between the pair of wheels, but this scenario makes for unstable driving/steering on normal roads, especially when turning a vehicle, as a straight axle cannot maintain even road contact of the wheels over uneven road surfaces.

A problem with locking differentials is the extraordinary amount of torque that can be directed into the gear set of the differential under off-roading conditions, once locked. In the locked configuration the side bevel gears of the differential are exposed to high loads which can lead to failure of the differential in a number of ways: teeth may be broken off the bevel or pinion gears, or the gears within the differential can separate, thus losing their working relationship to one another. Any one of the aforementioned failures can leave a vehicle immobile and stranded.

The present invention was conceived to alleviate these shortcomings.

Unless defined otherwise, all technical and scientific terms used herein have the same meaning as commonly understood by one of ordinary skill in the art to which this invention belongs.

Although any methods and materials similar or equivalent to those described herein can also be used in the practice or testing of the present invention, a limited number of the exemplary methods and materials are described herein.

SUMMARY OF THE INVENTION

In broad terms, one form of the invention provides a locking differential, comprising; a pair of rotating bevel gears engaged with one another via at least one pinion gear rotatably supported within a carrier; a locking member disposed within the carrier and engagable with each of the bevel gears, the locking member being movable between a locked configuration and an unlocked configuration, such that in the unlocked configuration the locking member allows free rotation of the bevel gears in engagement with the at least one pinion gear to equalize torque between a first bevel gear and a second bevel gear of the pair, and in the locked configuration the locking member locks the first bevel gear to the carrier and locks the second bevel gear to the carrier, simultaneously, to prevent relative movement therebetween.

The carrier may provide a central cavity for accommodating the bevel gears, and the at least one pinion gear.

The locked configuration may place the locking member in physical engagement between the first bevel gear and the carrier and in physical engagement between the second bevel gear and the carrier.

The locking member may comprise a movable sleeve that internally encircles the carrier. The sleeve may comprise a ring of external teeth at each of a first end and a second end thereof. The sleeve may further comprise a ring of internal teeth at each of the first end and second end thereof.

An internal surface of the carrier may provide a ring of splines for cooperating with the movable sleeve of the locking member therein.

Each of the first and the second bevel gears may comprise a ring of external spur teeth for cooperative engagement with the respective rings of the internal teeth at the first and second ends of the sleeve. Individual teeth of the rings of external spur teeth may protrude outwardly from a circumferential surface of each of the first and second bevel gears.

The sleeve may comprise a clutch sleeve and a clutch ring. The clutch sleeve may support a first ring of external teeth and a first ring of internal teeth at a first end of the sleeve. The clutch ring may support a second ring of external teeth and a second ring of internal teeth at a second end of the sleeve.

The first ring of external teeth of the clutch sleeve and the second ring of external teeth of the clutch ring may be configured to moveably engage with the splines of the cavity to lock the differential.

The first ring of external teeth of the clutch sleeve and the second ring of external teeth of the clutch ring may be configured to moveably engage with the splines of the cavity to un-lock the differential.

The locking differential may further comprise an actuator, selectively engagable to drive the locking member between the locked and the unlocked configuration.

The actuator may comprise a movable piston in proximity to the or a sleeve of the locking member. The actuator may further comprise a hydraulic or pneumatic system for moving the piston within the chamber to thereby drive movement of the sleeve.

The locking differential may further comprise a sealing assembly for fluidly sealing the chamber in which the piston resides.

The clutch sleeve may comprise a continuous side wall encircling an interior of the carrier, and further includes access holes within the side wall.

Each of the first and the second bevel gears may comprise a central aperture for receiving a drivable axle.

The locking differential may further comprise a pair of end caps for sealing the cavity of the carrier. At least one of the end caps may be threadingly engageable with the carrier.

At least one pinion gear is supported on a pinion shaft. The pinion shaft may be fixedly mounted in a pinion block. The pinion block may fixedly support a pinion cross-shaft and at least one short cross-shaft. The locking differential may comprise four pinion gears each of which is rotatably supported in contact with each of the pair of bevel gears. One of the pinion gears of the locking differential may be rotatably supported in contact with each of the pair of bevel gears. The locking differential may comprise two pinion gears, each of which is rotatably supported in contact with each of the pair of bevel gears.

In another aspect of the invention, there is provided a differential for a motor vehicle, the differential comprising: a locking differential as described above, the locking differential having an external gear disposed around the carrier, wherein the locking differential and external gear are housed within a differential housing, the external gear being configured to cooperate with a drive means of the motor vehicle.

In another aspect of the invention, there is provided a method of locking a locking differential, the method comprising the steps of: actuating a fluid supply to pressurize a chamber within a carrier of the differential, such that a locking member disposed at least partially within the chamber is moved relative to the carrier, to drive the locking member into simultaneous engagement with each of a first bevel gear, and a second bevel gear, to thereby prevent relative movement therebetween.

The first and second bevel gears may provide a series of external spur teeth, and the carrier provides a series of internal splines, and the locking member provides a plurality of internal teeth and external teeth, such that moving the locking member within the carrier drives the external teeth of the locking member along the internal splines of the carrier and drives the internal teeth of the locking member into engagement, with the spur teeth of each of the bevel gears, thereby locking the differential.

In some embodiments, the external teeth of the locking member are positioned in continuous contact with the internal splines of the carrier. In this manner the splines of the carrier provide a guide for the locking member to translate along. The splines further prevent rotation of the locking member within the carrier.

In some embodiments, the external teeth of the locking member are in continuous contact with the splines on the interior of the carrier, such that movement of the locking member within the carrier will drive the external teeth of the locking member along the splines of the carrier simultaneously as the internal teeth of the locking member are driven into engagement with the spur teeth of each of the side bevel gears.

Various features, aspects, and advantages of the invention will become more apparent from the following description of embodiments of the invention, along with the accompanying drawings in which like numerals represent like components.

BRIEF DESCRIPTION OF THE DRAWINGS

Embodiments of the invention are illustrated by way of example, and not by way of limitation, with reference to the accompanying drawings, of which:

FIG. 2A is a perspective view of a carrier of the differential of FIG. 1, illustrating a mounting flange for a crown wheel;

FIG. 2B is an end view of the carrier, illustrating a series of internal splines within the carrier;

FIG. 2C is a sectional view along line A-A of FIG. 2B through a rotational axis of the differential gear;

FIG. 3A is an external perspective view of an end cap for sealing a first end (or flange end) the carrier of FIG. 2;

FIG. 3B is an end view of the end cap illustrating a plurality of equally spaced lubricating apertures at a constant pitch circle diameter around the end cap;

FIG. 3C is a sectional view along line B-B of FIG. 3B illustrating a central and an annular recess within the end cap;

FIG. 3D is an internal perspective view of the end cap for sealing the first end (or flange end) of the carrier of FIG. 2;

FIG. 4A is a perspective view of a locking member of the differential gear;

FIG. 4B is a side view of the locking member of FIG. 4A, illustrating a plurality of external teeth projecting radially outwardly from the locking member;

FIG. 4C is a top view of the locking member illustrating a plurality of internal teeth projecting radially inwardly of the locking member;

FIG. 4D is a sectional view along line C-C of FIG. 4C illustrating an alignment between each respective rings of internal and external teeth;

FIG. 5A is a perspective view of a sleeve of the locking member of FIG. 4;

FIG. 5B is a top view of the sleeve illustrating the alignment between second rings of internal and external teeth radially disposed about the sleeve;

FIG. 5C is a sectional view along line D-D of FIG. 5B illustrating a series of pinion gear clearance apertures in a wall of the sleeve;

FIG. 6A is a perspective view of a clutch ring of the locking member of FIG. 4;

FIG. 6B is a top view of the clutch ring illustrating the alignment between first rings of internal and external teeth radially disposed about the clutch ring;

FIG. 6C is a sectional view along line E-E of FIG. 6B illustrating a protruding lip of the clutch sleeve;

FIG. 10A is a perspective view of a pinion gear housed within the differential gear meshingly engaged with a first and second side bevel gear of the pair;

FIG. 10B is a top view of the pinion gear of FIG. 10A illustrating a bevelled front face cut to form a plurality of outwardly and forwardly projecting pinion gear teeth;

FIG. 100 is a sectional view along line H-H of FIG. 10B illustrating an internal aperture for mounting the pinion gear within the differential gear;

FIG. 11A is a perspective view of a pinion block for supporting an inboard end of a short pinion shaft within the differential housing;

FIG. 11B is an end view of the pinion block of FIG. 10A illustrating a plurality of through apertures therein;

FIG. 110 is a sectional view along line J-J of FIG. 10B illustrating an intersection of the through apertures therein;

FIG. 20A is a perspective view of the seal housing and adjustor joined together;

FIG. 20B is an exploded view of the seal housing and adjustor illustrating their alignment to one another before joining;

FIG. 20C is a section from the combined seal housing and adjustor illustrating a shoulder screw profile therethrough;

Embodiments will now be described more fully hereinafter with reference to the accompanying drawings, in which various embodiments, although not the only possible embodiments, of the invention are shown. The invention may be embodied in many different forms and should not be construed as being limited to the embodiments described below.

DETAILED DESCRIPTION OF EMBODIMENTS

Whist the differential gear 1 is described herein in relation to use with a motor vehicle, it is contemplated that the differential gear 1 is applicable to other mechanical devices where torque is distributed between a plurality of rotating shafts or axles.

Figure 1:
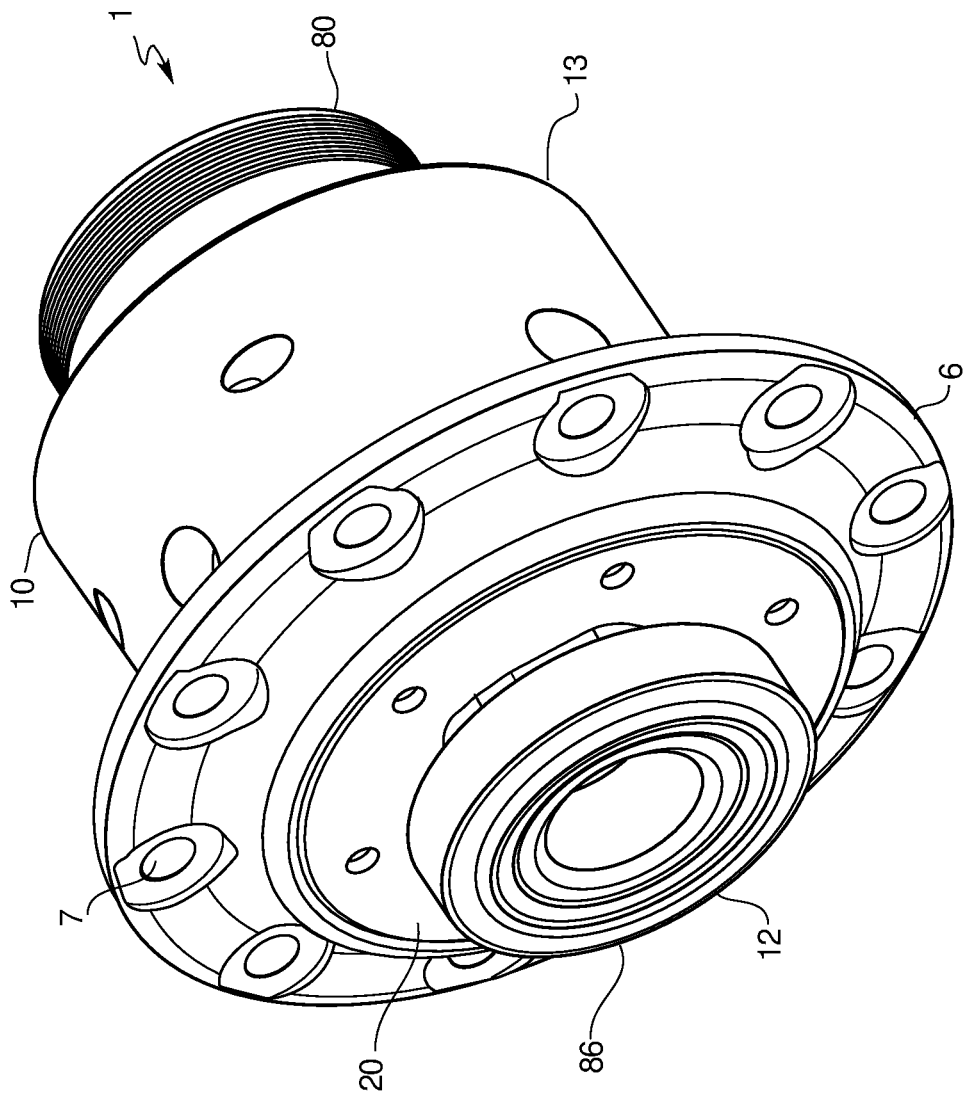
FIG. 1 is a perspective view of a differential gear according to an embodiment of the invention illustrating external features of the differential gear.

With reference to FIG. 1, a differential gear 1 is illustrated in accordance with one embodiment of the invention. The differential gear 1 is configured to distribute torque equally between a left axle and a right axle of a motor vehicle (not illustrated) and to vary the torque to each of the axles in response to the terrain over which the vehicle is travelling. In order to split the input torque evenly the left axle of the vehicle is connected to a first side bevel gear 40 within the differential gear 1 and the right axle of the vehicle is connected to a second side bevel gear 50 within the differential gear 1. As the differential receives input torque (T), the torque is distributed in equal amounts to each axle (T/2). If one wheel loses grip, the total torque going through the differential will be reduced, but the torque will still be equalised between each axle evenly. This is contrast to a solid axle (ie. no differential or a locked differential) where the wheel that maintains grip (traction) will receive a significantly larger portion of the torque eg. 70:30, as a result the torque is no longer evenly distributed between each axle.

The differential gear 1 comprises the pair of rotating side bevel gears 40,50 engaged with one another via at least one pinion gear 31 rotatably supported within a carrier 10; a locking member 60 being disposed within the carrier 10 and is engagable with each of the bevel gears 40,50, the locking member 60 being movable between a locked configuration and an unlocked configuration, such that in the unlocked configuration the locking member 60 allows free rotation of the bevel gears 40,50 in engagement with the at least one pinion gear 31 to equalise torque between the first bevel gear 40 and the second bevel gear 50 of the pair, and in the locked configuration the locking member 60 locks the first bevel gear 40 to the carrier 10 and locks the second bevel gear 50 to the carrier 10, simultaneously, to prevent relative movement therebetween.

FIG. 1 illustrates a first end 12 (or flange end) of the differential gear 1 having a bearing assembly 86 which supports the differential gear 1 within a differential housing (not illustrated). A second end 13 (or cylinder end) of the differential gear 1 has an identical bearing assembly 86 for supporting the differential gear 1 within the differential housing.

A first output shaft (first axle) passes though the bearing assembly 86 and journal 26 into the carrier 10 to be operably engaged with the first bevel gear 40. A second output shaft (second axle) passes though the bearing assembly 86 and journal 26' into the carrier 10 to be operably engaged with the second bevel gear 50.

Disposed about an outer circumference of the carrier 10 is a circular flange 6 for receiving an annular gear. The annular gear, not illustrated is commonly referred to as a crown wheel, wherein a motor or engine is used to drive the crown wheel and impart rotational motion therethrough to the differential 1. A plurality of mounting apertures 7 are equidistantly spaced around the circular flange 6 for mounting the crown wheel thereto.

The differential gear 1 comprises a carrier 10 having an internal cavity 15. Housed within the cavity 15 is a first 40 and second side bevel gear 50, both meshingly engaged with a pinion assembly 30. The pinion assembly can comprise a single pinion gear 31 rotatably mounted to a cross-shaft 37. Where four pinion gears 31 are assembled within the pinion assembly, a cross-shaft 37 and a pair of shorter cross-shafts 38 are assembled. The ends of the short cross-shafts 38 are supported by a pinion block 36 centrally disposed within the cavity 10.

A first end cap 20 seals the cavity 15 of the differential gear 1. The end cap 20 restrains components within the differential gear 1. A plurality of apertures 25 is disposed on an end face 22a of the end cap 20. The apertures 25 allow for lubricating fluids to pass into the carrier 10 within a differential housing (not illustrated). In use, the entire differential gear 1 floats in an oil bath within the differential housing to ensure that all components therein are well lubricated.

A second end cap 22 or cylinder end cap (not visible in FIG. 1) is disposed at the second end 13 of the differential gear and supports an actuator assembly 80 thereon, for locking the differential gear 1.

The second end cap 22 comprises a fluid chamber 21 (or cylinder) disposed at the second end 13 of the carrier 10. A piston 70 is at least partially disposed within the fluid chamber 21, such that when the actuator assembly 80 is activated, fluid is forced into the fluid chamber 21, increasing the pressure therein and driving the piston 70 to move the locking member 60 within the cavity 15 to lock the differential 1.

The first bevel gear 40 is located at the first end 12 (or flange end) of the carrier 10 and is connected to the left axle. The first bevel gear 40 has an outer face 42 disposed circumferentially around the bevel gear 40. The second bevel gear 50 is located at the second end 13 (or cylinder end) of the carrier 10 and is connected to the right axle. The second bevel gear 50 has an outer face 52 disposed circumferentially around the bevel gear 50.

The pinion gear 31 is housed within the cavity 15, such that the pinion gear 31 meshingly engages with the first bevel gear 40 at the first end 12 of the carrier 10 and meshingly engages with the second bevel gear 50 at the second end 13 of the carrier 10, thereby interconnecting the first bevel gear 40 and the second bevel gear 50.

The locking member 60 is also located within the cavity 15 of the carrier 10. The locking member 60 is configured to house the first 40 and second bevel gears 50 and the pinion gear 31 therein. The locking member 60 provides a first reaction surface 71 at a first end 61 and a second reaction surface 72 at a second end 62.

When the differential gear 1 is assembled, the second reaction surface 72 of the locking member 60 abuts the piston 70. When the actuator assembly 80 is activated the piston 70 urges the differential into a locked configuration wherein the first reaction surface 71 is driven into engagement with a biasing member 82. When the actuator assembly 80 is deactivated, the biasing member 82 applies a restoring force to the locking member 60 to return the locking member 60 and abutting piston 70 back to the unlocked configuration. The pressure in the fluid chamber 21 is greatly reduced to provide little or no resistance to the restoring force from the biasing member 82, once the actuator assembly 80 has been deactivated.

With the differential gear 1 described above, the actuator assembly 80 is activated by a user, to thereby lock the differential 1 at a predetermined time. The differential gear 1 thus operates in two distinct modes: locked and unlocked.

Turning now to FIGS. 2 to 19, the individual components of differential gear 1 will be described in more detail and their assembly within the carrier 10.

FIG. 2A illustrates the carrier 10 having the internal cavity 15 sealed at the first 12 and second 13 ends thereof with non-identical end caps 20, 22. The carrier 10 is not symmetrical as the crown wheel mounting flange 6 is disposed towards the first end 12. The mounting flange 6 may be located circumferentially around the external surface of the carrier 10 at any location between the first end 12 and the second end 13 of the carrier 10 without affecting the functionality of the differential gear 1. The exact placement of the flange 6 in any particular embodiment will be influenced by the packaging of the vehicle drive-train, specifically the connection gear location at the end of the prop shaft.

The flange 6 need not be continuous. Furthermore, alternative mounting means can be employed for the crown wheel such as clips, pins, welding, screw-threaded etc. The bolt holes 7 are ideally equidistantly spaced, circumferentially around the flange 6 to provide dynamic stability under rotational loading.

The carrier 10 is preferably made from steel or an alternative metal thus providing a strong and durable casing for the differential gear 1. When manufactured from steel or other suitable metals, the carrier 10 can be cast and machine finished to a high tolerance, thereby providing a dimensionally accurate component, both inside and out.

The carrier 10 can be made from a steel composite material, for example EN 36 A (a medium tensile carbon steel) AISI 8620 steel. Heat treated steel will typically exhibit an ultimate tensile strength of between 500 MPa and 700 MPa. Externally case hardened to a depth of about 1 mm. The carrier can also be made from SG iron or spheroidal graphite iron, a ductile form of iron, typically cast. SG iron is well suited to manufacturing the components of the differential gear 1, the carrier 10 and gears 40, 50, 31 as the nodular form of graphite within the material structure exhibits good resistance to linear cracking and allows the components to remain geometrically intact with reduced distortion.

The carrier 10 is illustrated to have a number of locating holes 19 for locating a pair of pinion-shafts 37, 38 within the carrier 10. A number of lubrication holes 25 are incorporated within the housing for lubricating the internal components of the differential gear 1. The differential gear 1 is typically sealed within differential housing, encasing the differential gear 1 and the ends of the left and the right axle of a vehicle therein so that the entire assembly can be continuously lubricated during use.

The cagier 10 is a cylindrical component having a single, continuous side wall 11. The side wall 11 has an outer surface 11a which is relatively planar. The side wall 11 has an internal surface 11b which is configured to provide a plurality of splines for cooperative engagement with the locking member 60, illustrated in FIG. 2B. The splines project outwardly, from the internal surface 11b of the side wall 11. The splines are formed in a first ring 2 at a first end of the carrier 10, and a second ring 3 at a second end of the carrier 10. Each ring of splines 2, 3 contains 32 teeth. This number of splines may be varied depending on the desired specifications of the differential gear 1.

The opposing ends of the cavity 10 are internally configured to provide mating threads 14, 14' for cooperating with the threaded portions of the first end cap 20 and second end cap 22. The face for the threaded portions 14,14' are illustrated in FIG. 20, although the threads themselves are not illustrated.

Figure 14:
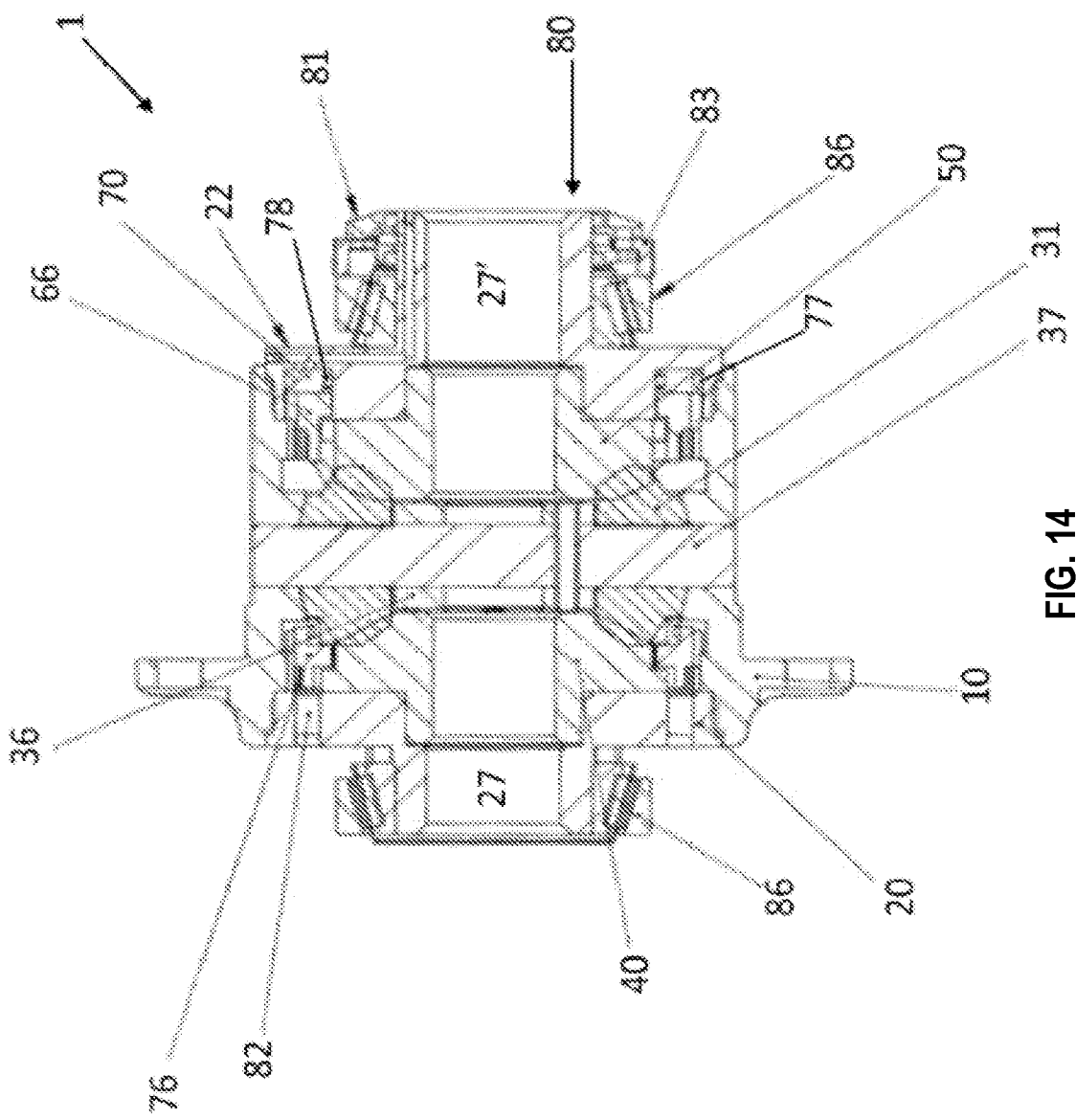
FIG. 14 is a sectional view of the differential gear illustrating the components therein in an unlocked configuration.

A central portion of the carrier 10 provides a thickened portion 11c of side wall 11. The thickened portion 11c is shaped to compliment a rear face 34 or the pinion gear 31 as illustrated in FIGS. 13 and 14.

Figure 17A:
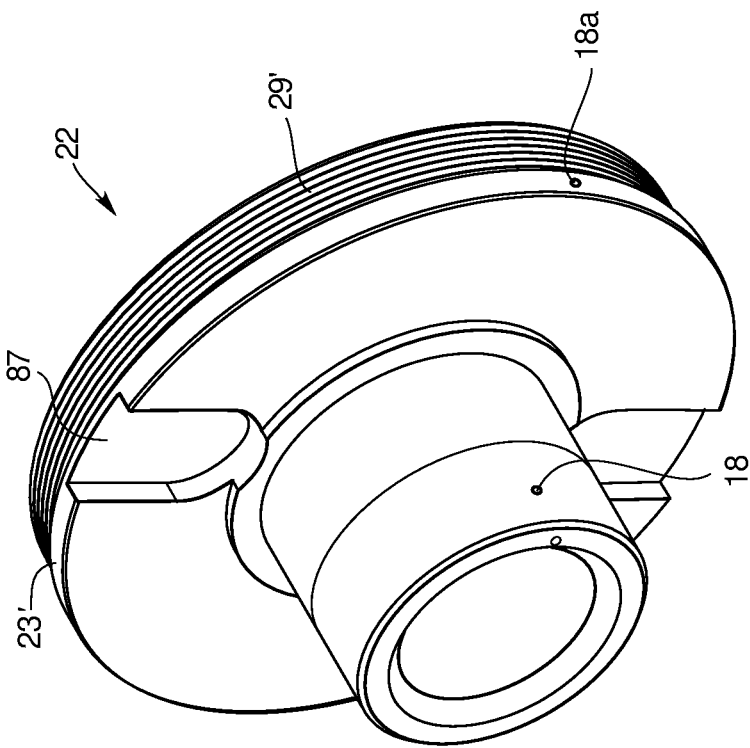
FIG. 17A is a perspective view of a second end cap for sealing a second end (or cylinder end) of the housing of FIG. 2.

The first end cap 20 is illustrated in FIG. 3A. The second end cap 22 is illustrated in FIG. 17A and will be described in further detail in relation to the actuator assembly 80. Each of the end caps 20, 22 has an end journal 26,26' for supporting the carrier 10 within a differential housing (not shown). Each of the journals 26,26' provides a smooth mounting surface for mounting the bearing assembly 86 thereon.

The journal 26 is hollow having a large central aperture 27. The left axle of the vehicle is inserted into the aperture 27 to be connected with the first bevel gear 40 inside the cavity 15 of the carrier 10. Likewise, the journal 26' provides a similar aperture 27' for enabling the right axle of the vehicle to be connected to the second bevel gear 50.

The end cap 20 is threadingly mounted to the carrier 11. The end cap 20 having a threaded portion 29 which engages with the mating threaded portion 14 of the carrier 10. This threaded connection provides a strong and releasable connection between the two components. Each of the end caps 20, 22 has a peripheral external surface 23,23' about which the thread 29,29' is disposed. The thread 29 is disposed on the surface 23 towards an inner facing edge 22b of the cap 20.

FIG. 3B illustrates a top view of the end cap 20, providing a plurality of equidistantly spaced apertures 25. These apertures 25 allow lubricating fluids to enter and exit the carrier 10 within the differential housing (not illustrated).

FIG. 3C is a cross-sectional view along line B-B of FIG. 3B. FIG. 3D is a perspective view onto the inner face 22b of the end cap 22, illustrating a continuous annular recess 24 within the end cap 20. This recess 24 houses the biasing member 82 for returning the differential gear 1 to an unlocked configuration after the actuator assembly 80 is disengaged. The biasing member 82 can be a spring or a compressible member. It is contemplated that an annular wave spring can be used or a plurality of wave springs, which will package into the annular recess 24, and are easily removed and replaced when necessary. The recess 24 need not be continuous and could alternatively be configured to house one or a plurality of spring around the inner surface 22b of the cap 20. The lubricating apertures 25 can be seen in FIG. 3D, where lubricating fluid can enter the carrier 10 and coat the internal components of the differential gear 1.

Torque is provided by a driven shaft, where the torque is transferred to the differential gear 1 by virtue of the crown wheel. Within the differential gear 1 the torque is evenly distributed or equalised between the two side bevel gears 40, 50, wherein the pinion gear 30 pushes against the side bevel gears 40,50, forcing the side gears 40,50 against the end caps 20,22 of the carrier 10. Accordingly, as the torque increases so too does the force exerted onto the carrier 10. Traditionally bolts have been used to secure end caps onto a differential carrier; however, the threaded connection described herein provides an improved strength over the connection of a bolted solution.

A mechanical advantage is provided by using a screw over a bolt, as a screw thread provides greater contact and frictional resistance than the smooth shank of a bolt. Accordingly, the threaded connection between the cap 20 and carrier 10 is strengthened to better withstand higher torque loads within the differential gear 1.

The carrier 10 (and end caps 20, 22) can be manufactured on a lathe and as such the tools required are readily available to cut a thread into the side wall 11 of the housing 11, during the manufacturing process. The screw thread then becomes an integrated part of the carrier 10 and end caps 20, 22. This eliminates the need for connecting bolts and thus eliminates the potential to lose the bolts that connect the carrier 10 and end caps 20, 22 together. By employing a threaded connection between carrier 10 and end caps 20, 22 the task of aligning the components before assembly is simplified as there are no discrete pairs of bolt holes to be aligned. By using a threaded connection and eliminating bolts (or other fasteners) a reduced parts count for the differential 1 is achieved, which further provides a weight saving. It is contemplated that this threaded connection between the carrier 10 and each of the end caps 20, 22 can be applied to a typical differential housing thereby providing all of the aforementioned advantages.

The screw thread 29 provides a stronger joint between the end cap 20 and the carrier 10 than that of a bolted connection, capable of withstanding pressures of up to 20 MPa (3000 psi). As the screw thread 29 of end caps 20,22 engage with mating threads 14, 14' located internally of the carrier 10, there are minimal projections on the outside of the carrier 10, reducing the opportunities for snagging other components whist the carrier 10 is revolving rapidly. This threaded connection also uses the packaging space within the differential housing more efficiently. A reduction in mass of carrier 10 can provide valuable extra packaging space for larger bevel gears 40, 50 and a larger pinion gear 31 making for a more robust and heavy duty differential gear 1.

The locking member 60 is illustrated in each of FIGS. 4A-4D. The locking member 60 can be made from a single component but for ease of manufacture and for ease of assembly of the differential gear 1, the locking member 60 comprises a clutch sleeve 66 and a clutch ring 76 (see FIGS. 5 and 6).

The locking member 60 is an essentially cylindrical component, having a first end 61 and a second end 62. The locking member 60 comprises a cylindrical side wall 65 having at least one pinion aperture 67 therein. In FIG. 4A, the locking member 60 is shown to have four apertures 67 to correspond with four pinion gear locations within the cavity 10.

These apertures 67 are formed within a side wall 65 of the locking member 60. The apertures 67 provide access the pinion gear 31 when in the pinion assembly 30. The apertures 67 also provide access for lubricating fluids to flow around the internal components of the differential gear 1.

The apertures 67 are oblate; however, it is contemplated that they can be configured as ovoid apertures without hampering the operation of the differential gear 1. The diameter of each aperture 67 is greater than that of the rear face 34 of the pinion gear 31 to allow the locking member 60 to translate back and forth within the carrier 10, without impacting or contacting the pinion gear 31 during its stroke S.

Inner walls 67a of the aperture 67 are cut to be perpendicular to a side wall 65 of the actuator 60. In some embodiments of the invention the inner walls 67a can be tapered to increase clearance around the pinion gear 31. In these alternative embodiments the inner diameter of the aperture 67 can be larger than that of the outer diameter of the aperture 67.

FIG. 4A is a perspective view of the locking member 60 illustrating a first reaction surface 71 at a first end 61 and a second reaction surface 72 at a second end 62, the second reaction surface 72 abutting the piston 70. Four rings of teeth are disposed circumferentially around the locking member 60. At the first end 61 there is provided an internal ring of teeth 68, and an external ring of teeth 63. At the second end 62 there is provided an internal ring of teeth 69 and an external ring of teeth 64. The number of teeth encircling the locking member 60 can be varied. So too the depth and length of the individual teeth to better transfer the load requirement on the differential gear 1.

At the first end 61 of the locking member 60 the first reaction surface 71 is formed as an annular rim. When assembled (and as illustrated in FIGS. 13 and 14 the first reaction surface 71 is aligned with the recess 24 and biasing member 82 located therein. When the differential gear 1 is locked the locking member 60 is urged forward within the cavity 10 of the carrier 10, and the first reaction surface 71 is driven into the recess 24 compressing the biasing member 82 therein. When the differential 1 is unlocked the pressure in fluid chamber 21 is released (or at least reduced) and the compressed biasing member 82 urges the first reaction surface 71 out of the recess 24 and in doing so, urges the locking member 60 back towards the second end 13 of the differential gear 1.

FIG. 5A is a perspective view of the clutch sleeve 66 of the locking member 60 of FIG. 4A. At the second end 62 is disposed the internal 69 and external 64 rings of teeth.

The number of internal teeth 69 equals the number of external teeth, as seen in FIG. 5B. However, this does not have to be the case for the locking member 60 to lock the differential 1. At the first end 61 of the clutch sleeve 66, there is a circumferential groove 84 in an outer surface 65a of the side wall 65. The groove 84 provides a bayonet-type fitting to engage the groove 84 of the clutch sleeve 66 with a series of projections 85 around the clutch ring 76. It is contemplated that other types of coupling could be used to join the clutch ring 76 with the clutch sleeve 66, for example a thread or twist-lock.

FIG. 6A is a perspective view of the clutch ring 76 of the locking member 60 of FIG. 4A. The external ring of teeth 63 and internal ring of teeth 68 are integrally formed with the clutch ring 76. In FIG. 68 the number of internal teeth 68 are equal to the number of external teeth 63. As with the clutch sleeve 66, the external teeth 63 need not equal the number of internal teeth 68.

Although the rings of internal teeth 68, 69 and external teeth 63, 64 are illustrated to be continuously disposed about the locking member 60, they need not be. A lesser number of discrete teeth could be disposed about the interior and exterior of the locking member 60 without loss of functionality. However, to achieve a greater strength and a more even load distribution about the locking member 60 the teeth are equally spaced around the entire inner and outer circumference of the locking member 60.

FIG. 60 illustrates the first reaction surface 71 at the first end 61 of the clutch ring 76. At the second end 62 of the clutch ring 76 is provided a pair of discrete projections 85 extending partially around an internal surface of the clutch ring 76 for coupling with groove 84. The projections can comprise a single or a series of machined lugs around the circumference of the clutch ring 76.

Figure 7A:
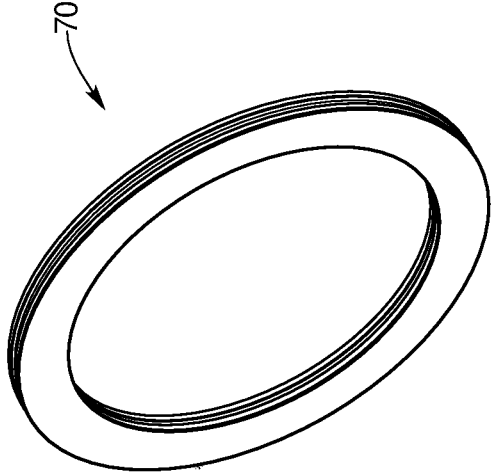
FIG. 7A is a perspective view of a piston for driving the differential into a locked configuration.
Figure 7C:
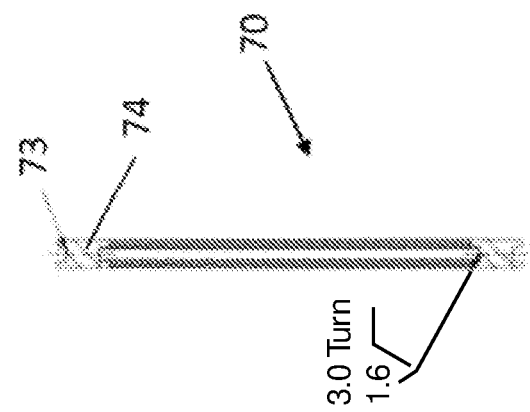
FIG. 7C is a sectional view along line F-F of FIG. 78 illustrating an H-shaped cross-section to the piston.
Figure 7B:
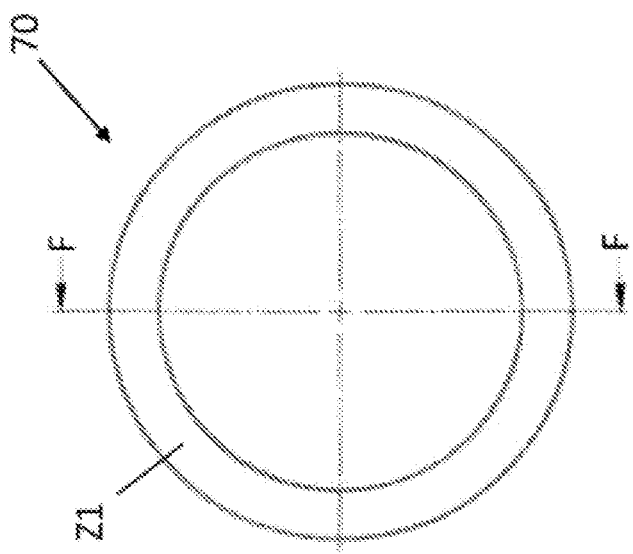
FIG. 7B is a top view of the piston, illustrating an annular configuration.

Abutted to the second end 62 of the locking member 60 is the piston 70 (see FIG. 4D). The locking member 60 is constrained to move linearly within the carrier 10, when pressure is applied via the piston 70. The piston 70 applies pressure across an annular first contact zone Z1 of the piston 70 onto a second annular reaction surface 72 of the locking member 60 (see FIG. 78). The diameter of the annular cross-section of the piston 70 can be increased if a larger contact zone Z1 is required. A perspective view of the piston 70 is illustrated in FIG. 7A.

The piston 70 comprises an annular or toroidal form. The piston 70 has an H-shaped cross-section, the "H" being oriented to form: an outer seat 73 for an O-ring 77 between the piston 70 and an outer wall 21a of the fluid chamber 21; and an inner seat 74 for an O-ring 78 between the piston 70 and an inner wall 21b of the fluid chamber 21. The O-ring 77 externally circumvents the piston 70 and O-ring 78, internally circumvents the piston 70. The two O-rings 77, 78 in combination with the piston 70 seal the fluid chamber 21 within the second end cap 22.

Figure 8A:
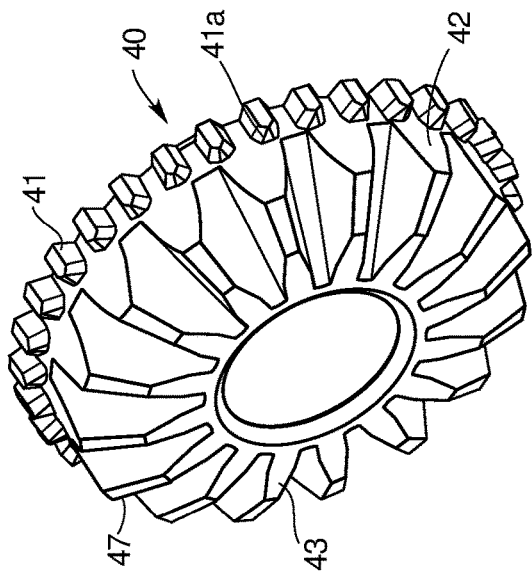
FIG. 8A is a perspective view of a flange-side side bevel gear housed within the differential gear.
Figure 8C:
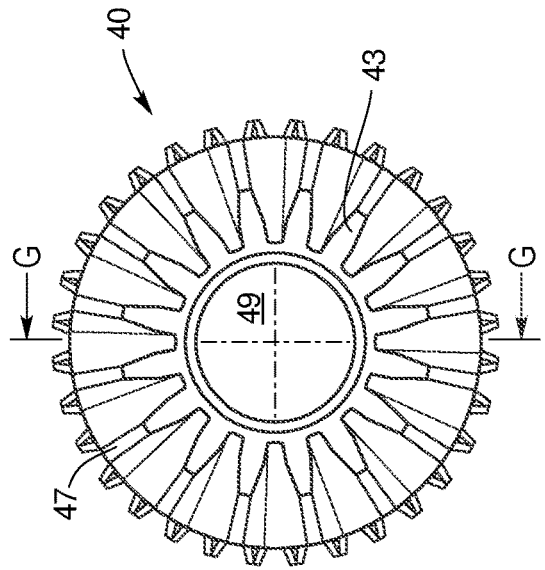
FIG. 8C is a sectional view along line G-G of FIG. 8B illustrating an internal aperture forming a mounting collar, for mounting the side bevel gear to an axle or similar rotating shaft.

FIG. 8A is a perspective view of side bevel gear 40 of the pair of side bevel gears 40, 50. The first bevel gear 40 comprises a front face 43 that faces toward the pinion assembly 30 and a rear face 45 that faces towards the first end cap 20 when assembled within the differential gear 1.

The bevel gear 40 has an outer surface 42 having a relatively constant diameter and a peripheral skirt 44 from which a plurality of teeth 41 are cut. The teeth 41 are disposed circumferentially around the outer surface 42 located towards the rear face 45 of the bevel gear 40, illustrated in FIGS. 8A and 8C.

Figure 8B:
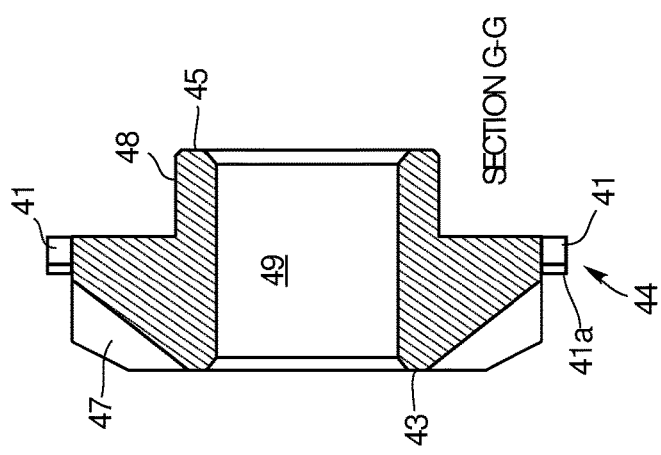
FIG. 8B is a top view of the side bevel gear of FIG. 8A illustrating a plurality of outwardly projecting spur teeth.

The peripheral skirt 44 provides a plurality of spur teeth 41. The spur teeth 41 are equidistantly disposed around the outer surface 42, projecting outwardly from the outer surface 42. FIG. 8B illustrates a total of 32 spur teeth 41, disposed about the bevel gear 40. These spur teeth 41 become engaged with the internal teeth 68 of the clutch ring 76, to prevent rotation of the first bevel gear 40 relative to the carrier 10 when the differential is locked.

In an unlocked configuration the external teeth 63 of the clutch ring 76 are continuously engaged with the splines 2 of the carrier 10. When the differential is locked, the clutch ring 76 is translated along the splines 2, maintaining contact therewith and simultaneously engaging internal teeth 68 of the clutch ring 76 with the spur teeth 41 of the bevel gear 40. Once locked, the bevel gear 40 cannot rotate relative to the carrier 10. Consequently, the left axle attached to the bevel gear 40 cannot rotate relative to the carrier 10.

The spur teeth 41 are directional, in that they have a tapered end 41a adjacent to the internal teeth 68 of the clutch ring 76 to smooth engagement therebetween, when the differential is locked.

The bevel teeth 47 are precisely cut to a high degree of accuracy, to frictionless y mesh with the pinion gear 31 disposed therebetween.

A large central aperture 49 is provided within the bevel gear 40, for inserting or otherwise engaging the left axle of the vehicle. The axles are generally splined or keyed to provide a non-rotating contact between each axle and the respective bevel gear 40, 50. Furthermore, bolts or other securing fittings can be attached between the axles and axle mounting collar 48 on the rear faces of bevel gear 40.

Figure 9A:
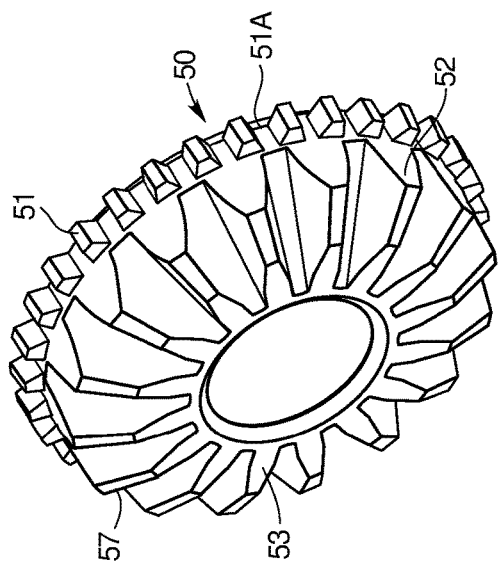
FIG. 9A is a perspective view of a cylinder-side side bevel gear housed within the differential gear.

FIG. 9A is a perspective view of side bevel gear 50 of the pair of side bevel dears 40, 50. The second bevel gear 50 comprises a front face 53 that faces toward the pinion assembly 30 and a rear face 55 that faces towards the second end cap 22' when assembled within the differential gear 1.

The bevel gear 50 has an outer surface 52 having a relatively constant diameter and a peripheral skirt 54 from which a plurality of teeth 51 are cut. The teeth 51 are disposed circumferentially around the outer surface 52 located towards the rear face 55 of the bevel gear 50, illustrated in FIGS. 9A and 9C.

Figure 9B:
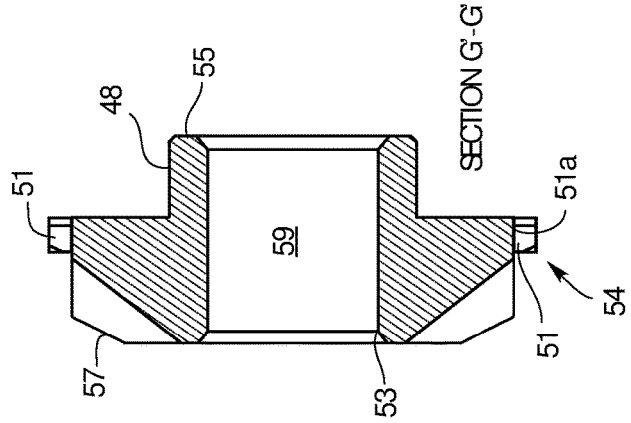
FIG. 9B is a top view of the side bevel gear of FIG. 9A illustrating a plurality of outwardly projecting spur teeth.
Figure 9C:
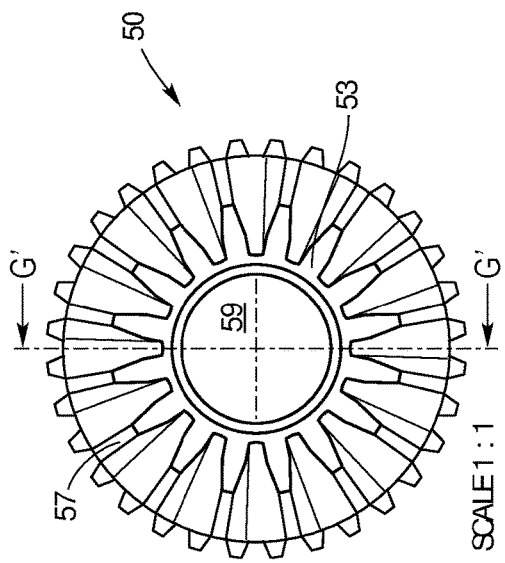
FIG. 9C is a sectional view along line G'-G' of FIG. 9B illustrating an internal aperture forming a mounting collar, for mounting the side bevel gear to an axle or similar rotating shaft.
Figure 12A:
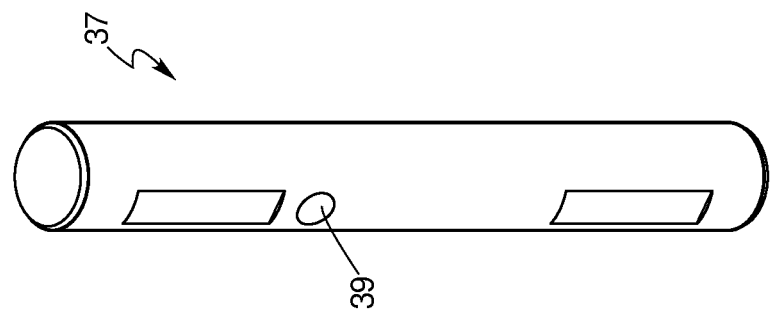
FIG. 12A is a perspective view of a pinion shaft for supporting the pinion gear relative to the pinion block.
Figure 12C:
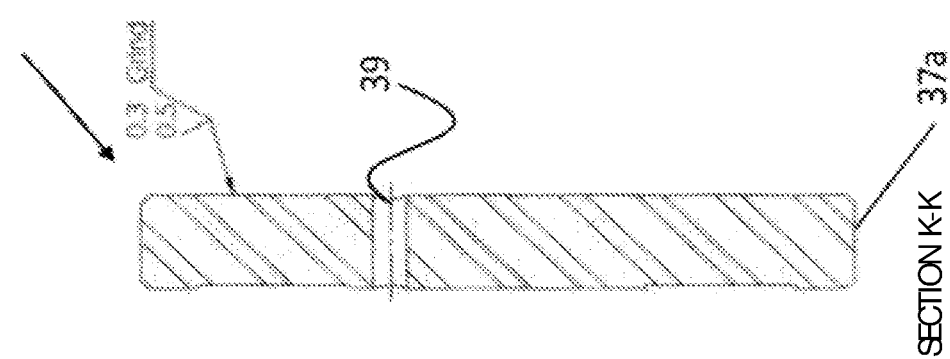
FIG. 12C is a sectional view along line K-K of FIG. 12B illustrating the bore passing through the pinion shaft.
Figure 12B:
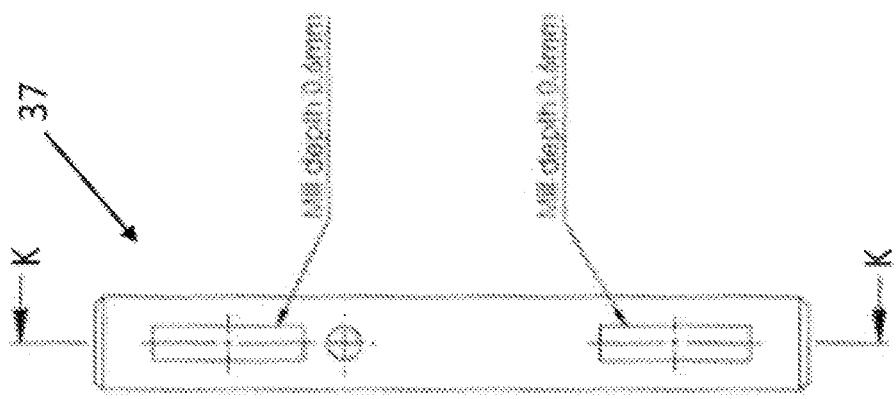
FIG. 12B is a side view of the pinion shaft of FIG. 12A illustrating a bore of the pinion shaft for receiving a retaining pin.
Figure 13A:
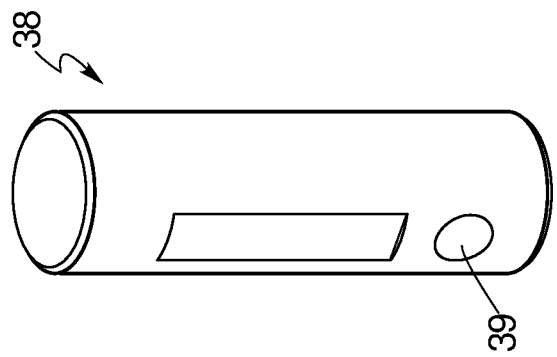
FIG. 13A is a perspective view of a short pinion shaft for supporting a supplementary pinion gear relative to the pinion block.
Figure 13C:
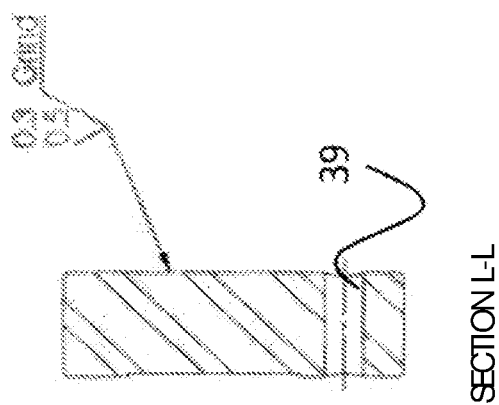
FIG. 13C is a sectional view along line L-L of FIG. 13B illustrating the bore passing through the short pinion shaft.
Figure 13B:
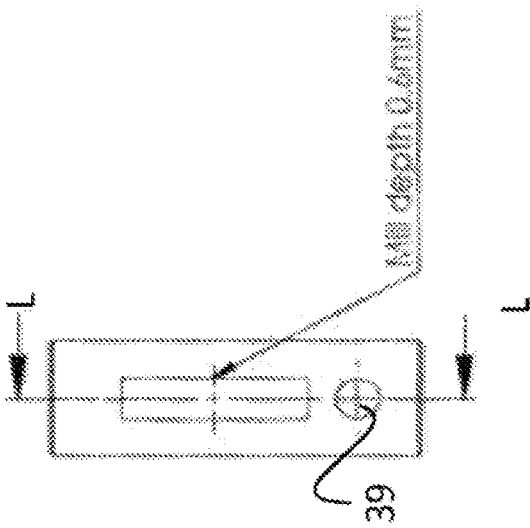
FIG. 13B is a side view of the short pinion shaft of FIG. 13A illustrating a bore of the short pinion shaft for receiving a locking pin.

The peripheral skirt 54 provides a plurality of spur teeth 51. The spur teeth 51 are equidistantly disposed around the outer surface 52, projecting outwardly from the outer surface 52. FIG. 9B illustrates a total of 32 spur teeth 51, disposed about the bevel gear 50. These spur teeth 51 become engaged with the internal teeth 69 of the clutch sleeve 66, to prevent rotation of the second bevel gear 50 relative to the carrier 10 when the differential is locked.

In an unlocked configuration the external teeth 64 of the clutch sleeve 66 are continuously engaged with the splines 3 of the carrier 10. When the differential is locked, the clutch sleeve 66 is translated along the splines 3, maintaining contact therewith and simultaneously engaging internal teeth 69 of the clutch sleeve 66 with the spur teeth 51 of the bevel gear 50. Once locked, the bevel gear 50 cannot rotate relative to the carrier 10. Consequently, the right axle attached to the bevel gear 50 cannot rotate relative to the carrier 10.

The spur teeth 51 are directional, in that they have a tapered end 51a adjacent to the internal teeth 69 of the clutch sleeve 66 to smooth engagement therebetween, when the differential is locked.

The bevel teeth 57 are precisely cut to a high degree of accuracy to frictionlessly mesh with the pinion gear 31 disposed therebetween.

A large central aperture 59 is provided within the bevel gear 50, for inserting or otherwise engaging the right axle of the vehicle. The axles are generally splined or keyed to provide a non-rotating contact between each axle and the respective bevel gear 40, 50. Furthermore, bolts or other securing fittings can be attached between the axles and respective axle mounting collars 48, 58 on the rear faces of each bevel gear 40, 50.

Each of the bevel gears 40, 50 have 16 bevel teeth 47, 57 for meshing engagement with bevel teeth 32 of at least one pinion gear 31. The bevel teeth 47, 57 are straight in profile and extend across the front face 43, 53 of each gear 40, 50. FIGS. 8B/9B and 8C/9C illustrate the bevel teeth 47, 57. The pinion gear 31, by comparison to the side gears 40, 50, has only 9 bevel teeth 32. Accordingly, the bevel side gears 40, 50 are offset from one another by one tooth of the pinion gear 31.

The pinion gear 31 is illustrated in greater detail in each of FIGS. 10A-10C. The front perspective view of FIG. 10A illustrates the plurality of bevel teeth 32 formed in a front face 33 of the bevel gear 31. Typically, the pinion gear 31 is forged and machine-cut to the required degree of accuracy. The bevel teeth 32 are located on the front face 33 of the pinion gear 31 to meshingly engage with the bevel teeth 47, 57 of the first and second bevel gears 40, 50 when mounted within the carrier 10.

A rear face 34 of the pinion gear 31 is located on an opposing side of the gear to the front face 33. The rear face 34 of the pinion gear 31 is contoured to locate within the carrier 10 in close proximity to the thickened wall section 11c of the side wall 11.

The pinion gear 31 has a central bore 35 that extends through the gear from the front face 33 to the rear face 34. The bore 35 is dimensioned to receive a pinion-shaft 37, 38 to rotatably mount the pinion gear 31 within the carrier 10.

The differential gear 1 functions with a single pinion gear 31 providing contact between the first and the second side bevel gears 40, 50. To increase the contact between the first and second side bevel gears 40, 50 a second pinion gear 31 can be mounted in meshing engagement between the side bevel gears 40, 50. In the embodiment of the differential gear 1 illustrated in FIGS. 14-16, four pinion gears 31 are incorporated into the pinion assembly 30, although only two pinion gears are visible within each sectional view. Increasing the number of pinion gears, increases the load capacity of the differential gear 1 as there are more teeth in contact between the side bevel gears 40,50 to distribute load.

To hold the pinion assembly 30 together at its core is a pinion block 36 illustrated in FIGS. 11A-11C. The pinion assembly 30 is disposed within the carrier 10. The pinion assembly 30 comprises the pinion block 36, a long pinion-shaft 37 and two short pinion-shafts 38 (illustrated in FIGS. 12A-12C and 13A-13C). The long pinion-shaft 37 and short pinion-shafts 38 are centrally mounted in the pinion block 36 to form a cross-shaped assembly upon which the four pinion gears 31 are equidistantly mounted.

Where the pinion assembly 30 comprises only two pinion gears 31 and a single long pinion-shaft 37, there is no requirement for a pinion block 36 as the pinion assembly 30 will be held in place by the bevel gears. The pinion block 36 is only required to secure inboard ends of the short pinion-shafts 38 within the pinion assembly 30.

A series of apertures 39 within the pinion block 36 and each of the respective pinion-shafts 37, 38 are configured to receive bolts, pins or roll pins (not illustrated) to hold the pinion assembly 30 together. Roll pins can be used as retaining pins to lock the pinion-shafts and pinion block to one another, and once in position, the roll pins are constrained within the pinion assembly 30 and cannot escape the apertures 39. In an alternative embodiment, the pinion-shaft 37 and short pinion-shafts 38 can be extended or shortened in length to receive internal or external circlips around end portions thereof, thus securing the pinion assembly 30 about the pinion block 36 without the need for pins. The pinion assembly 30 and the pair of side bevel gears 40, 50 are sometimes referred to as a "spider gear" or "spider gear set".

The long pinion-shaft 37 passes through the pinion block 36, and two short pinion-shafts 38 are inserted to the apertures 36a on either side of the long pinion-shaft 37 wherein the plurality of securing bolts/pins are inserted into the apertures 39 that pass through both the pinion block 36 and one of each of the pinion-shafts 37, 38 to secure the assembly.

The pinion gears 31 are slidingly mounted onto the pinion-shafts 37, 38 with the front face 33 of each pinion gear 31 facing toward the pinion block 36. The rear face 34 of each pinion gear 31 is oriented to face the internal wall 11b of the carrier 10.

As each pinion gear 31 is free to slide along the pinion-shaft 37, 38 a restraint to their movement is provided by means of the thickened section 11c in the wall 11b of the carrier 10 (illustrated in section view in FIG. 20). The pinion gears 31 are thus rotatably trapped upon the pinion-shafts 37, 38 and when assembled, constrained linearly by the carrier 10 and internally by bevel teeth 47, 57 of the side bevel gears 40,50, The rear face 34 of the pinion gear 31 is contoured. This contouring of the pinion gear conforms to the inside wall 11b of the carrier 10. The rear face 34 of the pinion gear 31 abuts the internal wall 11b of the carrier 10 when the differential gear 1 is assembled, this assist in holding the pinion gear 31 in place.

Some embodiments of the differential gear 1 can be assembled to have only one pinion gear 31, or two pinion gears 31 or three pinion gears 31. However, the four pinion gears 31 illustrated in FIG. 14, enable the differential gear 1 capable of taking high loads, having four pinion gears 31 to distribute load between the side gears 40, 50. Fewer pinion gears 31 provide less load transfer capacity between the first 40 and second 50 side bevel gears.

In the assembled differential gear 1 the pinion assembly 30 is located within the locking member 60, disposed between the first 40 and second 50 bevel gears, all of which is then packaged within the cavity 15 of the carrier 10.

In FIG. 14 the locking member 60 encircles the pinion assembly 30, the side bevel gears 40, 50 and a portion of the second end cap 22. In this configuration each of the gears 31, 40, 50 are free to rotate within the differential gear 1. Specifically, as the differential gear 1 is driven via the flange 6, the torque inputted to the gear 1 is equally distributed to each of the left and right axles (via the rotating first and second bevel gears 40, 50). The maximum torque transferred into the differential gear 1 varies with respect to the minimum traction (or resistance) of a ground contacting wheel, attached to each of the left and right axles. When the pinion gear 31 and side bevel gears 40, 50 are free to rotate, the differential gear 1 is unlocked, and torque is equally distributed, through the gear 1 to each of the two axles.

Figure 15:
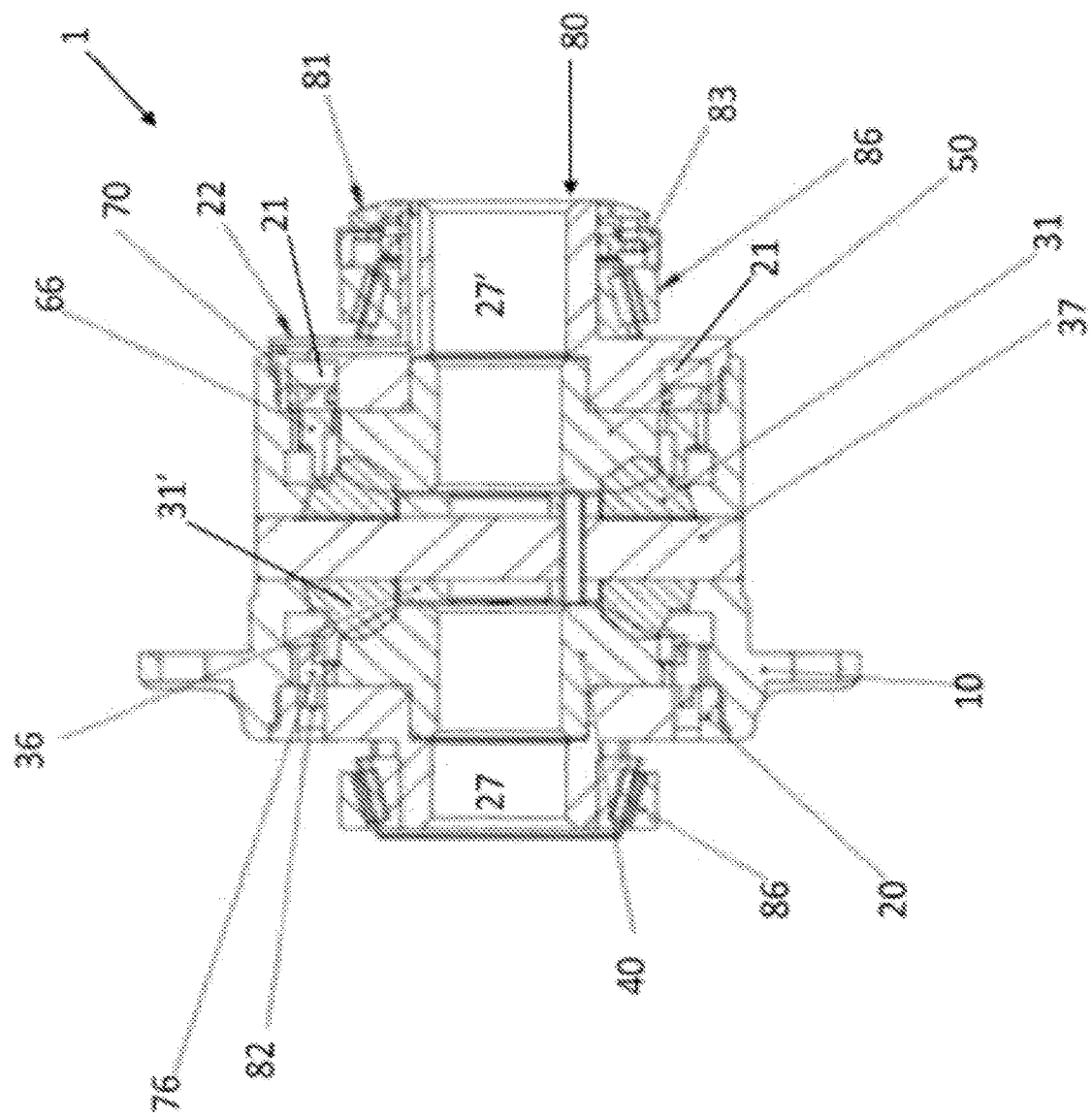
FIG. 15 is a sectional view of the differential gear illustrating the components therein in a locked configuration.

In FIG. 15, the locking member 60 has moved towards the first end 12 of the differential gear 1. The translational movement of the locking member 60 is driven by the piston 70 applying force onto the second reaction surface 72 of the locking member via the first contact zone Z1.

In the unlocked configuration the first ring of external teeth 63 are engaged with the first ring of splines 2 of the carrier 10; and the second ring of external teeth 64 are engaged with the second ring of splines 3 of the carrier 10. The splines 2, 3 are meshingly engaged with external teeth 63, 64 and the contact therebetween prevents the locking member 60 from rotating within the carrier 10.

To lock the differential the locking member 60 is translated across the cavity 15, whereby:
the first ring of external teeth 63 are driven along the splines 2 maintaining contact therewith;
the second ring of external teeth 64 are driven along the splines 3 maintaining contact therewith;
the first ring of internal teeth 68 are driven into engagement with the first ring of spur teeth 41 of the first side bevel gear 40; and
the second ring of internal teeth 69 are driven into engagement with the second ring of spur teeth 51 of the second side bevel gear 50.

In the above described locked configuration the bevel teeth 47, 57 of the bevel gears 40,50 are effectively removed from the transmission of torque, as the torque is transferred directly through the carrier 10 and the spur teeth 41, 51. This greatly reduces the potential for breakage of the bevel teeth 47, 57 of the side gears 40, 50. The bevel teeth once locked are removed from the internal load path of the differential and thus transmit minimal load therethrough. This arrangement can all but eliminate breakage of the bevel teeth as the load typically causing breakage of the teeth is removed. Because of this path for torque to be transferred through the differential gear 1, the pinion gear/s 31 is/are also not loaded when the differential 1 is locked, reducing the propensity for damage, breakage and shearing of their bevel teeth 32. This load path across the differential reduces the propensity for gear teeth breakage from overloading and thus reduces the potential for damage to the differential gear 1 when locked.

Typically, any locking of a differential gear 1 requires careful control over the timing, to avoid damage to the gear teeth. The above configuration reduces the propensity for breakage without the need for complex timing control Pinion gears 31 are more prone to failure (compared to side bevel gears) due to splitting at the root of the bevel teeth 32. This is a weak point on the bevel gear teeth 32 due in part to a greatly reduced material cross-section. When the differential gear 1 is locked, the maximum torque is limited by the wheel with the most traction (as opposed to being limited by the wheel with the least traction in an open configuration) as such the maximum torque experienced when the differential gear 1 is locked is significantly increased when compared to the open (unlocked) differential configuration. This problem is greatly reduced in the differential gear 1 described herein.

Figure 16:
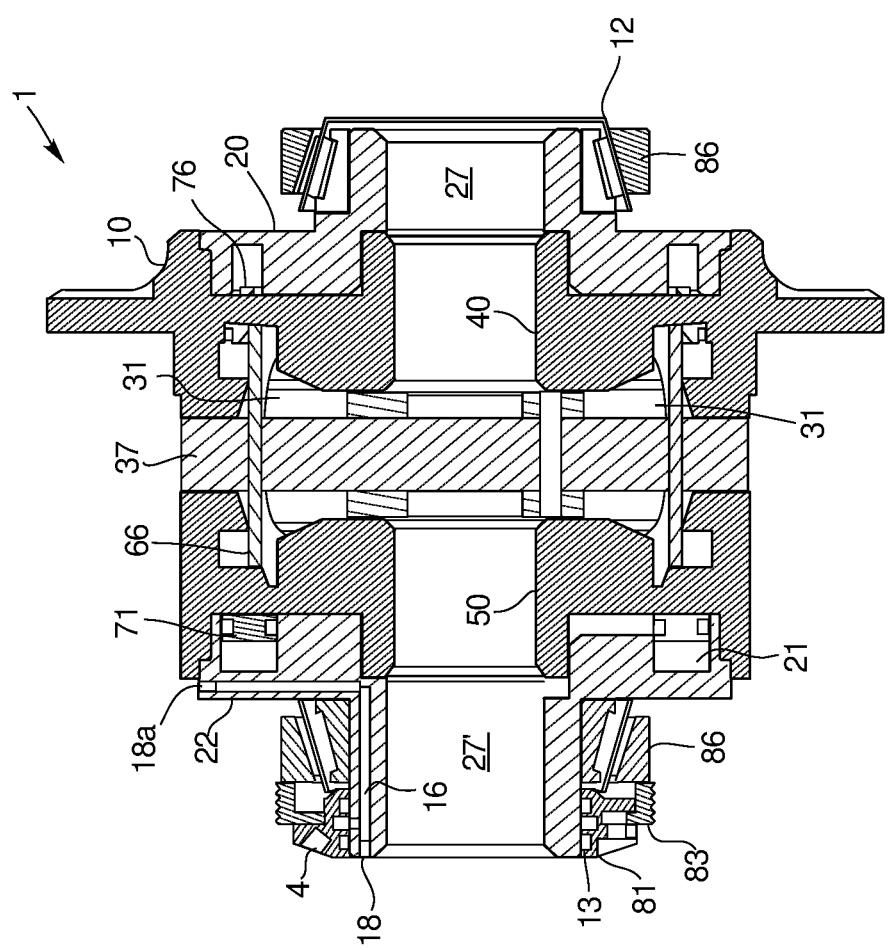
FIG. 16 is a sectional view of the differential gear of FIG. 15 illustrating an actuator assembly mounted to a second end (cylinder end) of the differential gear.

The above connections are illustrated in FIG. 16 where each of the above described components that are driven into contact with the locking member 60 have been shaded in black. All of these blackened components are then constrained to each other and will all rotate together. In this configuration, the differential gear 1 is locked and torque is sent straight to the axles with proportional distribution based on traction. The left and right axles, via the bevel gears 40, 50 are constrained to rotate as a single axle across the vehicle.

As the first reaction surface 71 of the locking member 60 moves forward, the annular form of the first reaction surface 71 is driven into the aligned, annular recess 24 which houses the biasing member 82 in the form of a wave spring. While the pressure in the fluid chamber 21 is sufficient, the locking member is held towards the first end 12 of the carrier 10 against the wave spring. A wave spring can reduce spring volume by up to 50% against comparable, conventional spring stiffness. When the pressure drops in the fluid chamber 21 the spring force of the biasing member 82 will return the locking member and abutting piston 70 to the second end 13 of the carrier 10, reversing the engagement of the internal and external teeth 63, 64, 68, 69 of the locking member 60 with the spur teeth 41, 51 of the bevel gears 40, 50 and the splines 2, 3 of the carrier 10, simultaneously returning the gears 31, 40, 50 to a state of free rotation within the carrier 10.

Illustrated in each of FIGS. 14 and 15 disposed at the second end 13 of the differential gear 1, is the actuator assembly 80. An input from a user, or driver, can activate the actuator assembly 80 to lock or unlock the differential gear 1. For example, a driver may actuate a switch in the cabin of a vehicle to initiate fluid flow to the actuator assembly 80 thereby locking the gear 1. Conversely, stopping or interrupting the fluid flow with return the differential 1 to an unlocked configuration, on demand.

The actuator assembly 80 comprises the second end cap 22, a seal housing 81 and an adjustor nut 83, for adjusting the backlash on the crown wheel and pinion and preloading the carrier bearings 86.

Figure 17B:
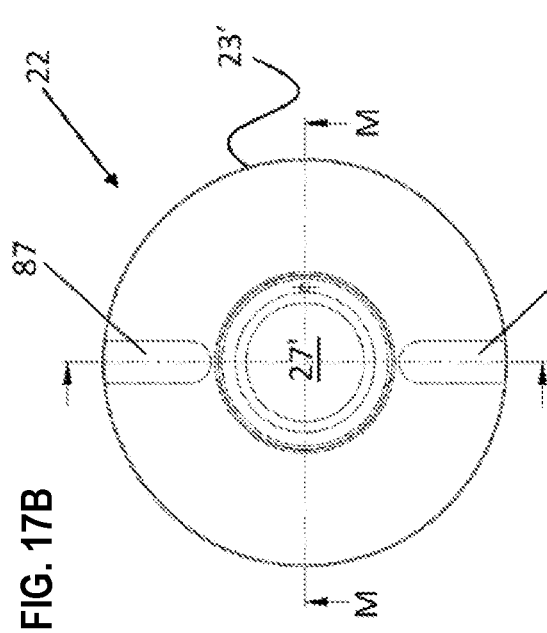
FIG. 17B is an end view of the second end cap.
Figure 17C:
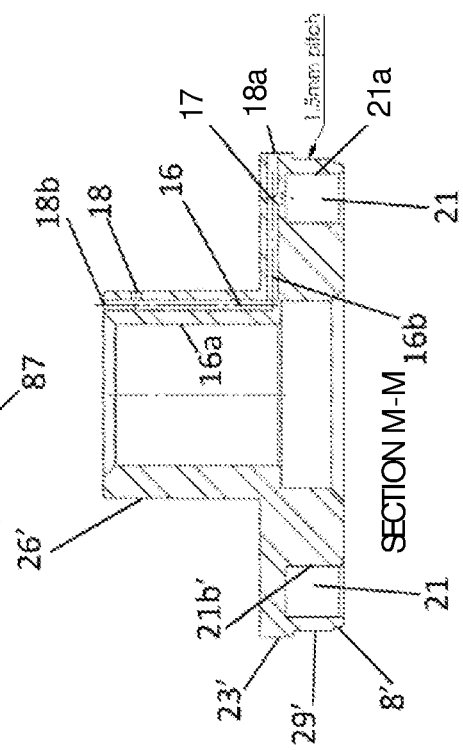
FIG. 17C is a sectional view along line M-M of FIG. 17B illustrating an internal uid conduit extending between the fluid inlet and the fluid outlet.
Figure 18B:
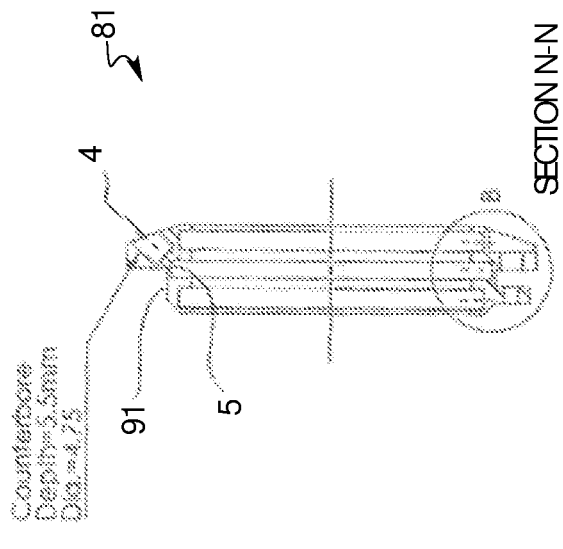
FIG. 18B is a sectional view along line N-N of FIG. 18A internally illustrating a valve for introducing fluid into the fluid gallery of the second end cap.
Figure 18D:
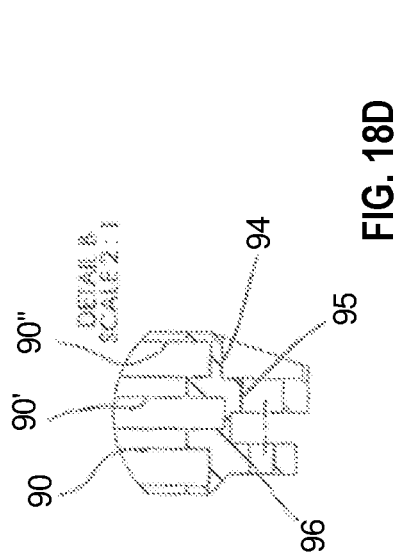
FIG. 18D is an enlarged view from circle B of FIG. 18B internally illustrating a shoulder screw aperture within the seal housing.
Figure 18A:
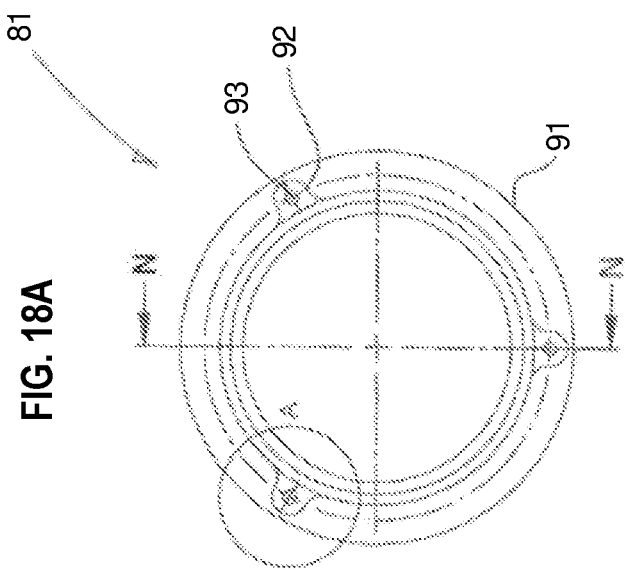
FIG. 18A is a top view of a seal housing for introducing fluid into a fluid gallery of the second end cap.
Figure 18C:
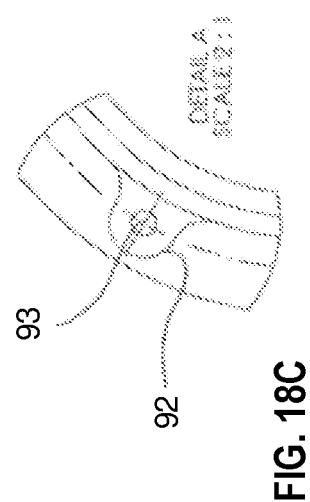
FIG. 18C is an enlarged view from circle A of FIG. 18A of a mounting aperture for securing the seal housing to the adjustor nut.
Figure 19C:
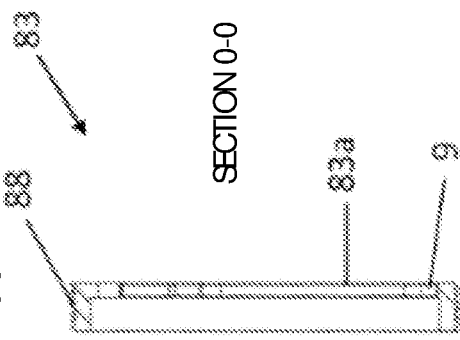
FIG. 19C is a sectional view along line O-O of FIG. 19B illustrating an external thread circumferentially disposed about the adjustor.
Figure 19A:
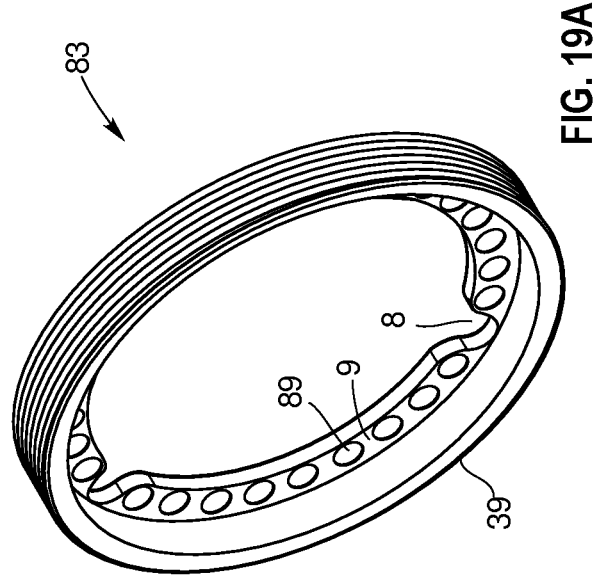
FIG. 19A is a perspective view of an adjustor nut of the actuator assembly of FIG. 16.
Figure 19B:
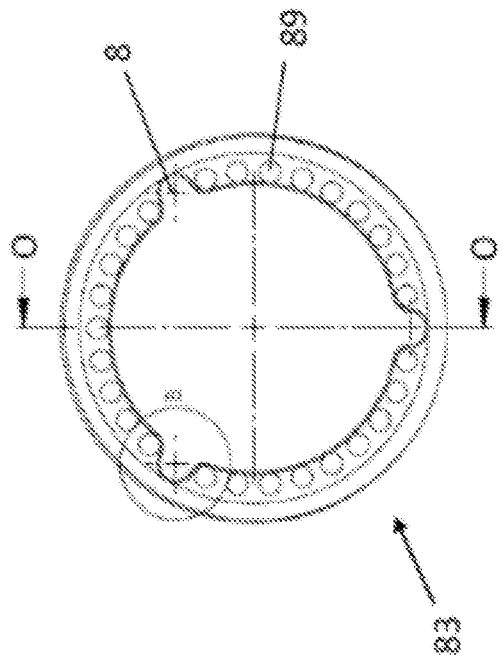
FIG. 19B is a top view of the adjustor of FIG. 19A.
Figure 19D:
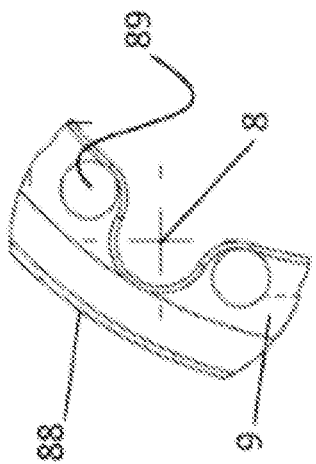
FIG. 19D is an enlarged view from circle B of FIG. 19B internally illustrating a receiving recess within the adjustor nut.

The second end cap 22 (or cylinder end cap, so called because the end cap 22 houses the fluid chamber 21 or cylinder in which the piston 70 operates), is illustrated in FIGS. 17A-17C. FIG. 17A is a perspective view of the end cap 22, and an outer circumferential surface 23' is illustrated upon which a screw-thread 29' is formed. As described above in relation to the first end cap 20, a threaded connection provides a strong, secure, and space efficient connection between the second end cap 22 and the carrier 10.

Like the first end cap 20, the second end cap 22 provides a mounting journal 26' having a journal aperture 27' for receiving the right axle of a vehicle. The mounting journal 26' is longer than the journal 26 of the first end cap 20 because it supports both the bearing assembly 86 and the actuator assembly 80 thereon.

The top view of the second end cap 22, as illustrated in FIG. 17B, provides two slotted recesses 87. These recesses 87 are configured to receive a spanner or similar tool for tightening and loosening the end cap 22 from the carrier 10. The slotted recesses 87 further provide an access point to place a tool or lever under the bearing assembly 86, to thereby remove the bearing assembly 86 from the mounting journals 26, 26'.

The mounting journal 26' and the outer circumferential surface 23' of the end cap 22 respectively, provides an end cap fluid inlet 18 and a chamber fluid inlet 17 for driving fluid into the chamber 21 through the end cap 22. A fluid conduit 16 is disposed between inlet 18 and chamber inlet 17, illustrated in the sectional view of FIG. 17C. The fluid conduit 16 is drilled from two inlets 18a, 18b on two external faces of the end cap 22, the two faces providing perpendicular conduits 16a, 16b which converge within the end cap 22. When the end cap 22 is ready to be attached to the carrier 10, the inlet 18a and inlet 18b are blocked preventing fluid leakage therethrough (illustrated in FIG. 16).

The inlet 17 to the fluid chamber 21 is disposed along the conduit 16 between the two inlets 18a, 18b. This inlet 17 allows a working fluid to be pumped into the fluid chamber 21, to pressurise the chamber 21 and drive the piston 70 within the chamber 21.

The fluid chamber 21 is annular in shape and thus provides a shallow cylinder in which to house the piston 70. The annular chamber 21 is embedded within the second end cap 22 and provides an outer circumferential wall 21a and an inner circumferential wall 21b. When a pair of O-rings 77, 78 is disposed around the inner and outer surfaces of the piston 70, the O-rings 77, 78 form a compressive seal with the inner and outer circumferential walls 21a, 21b of the chamber 21. These seals 77, 78 limit the ability of the working fluid, under pressure, to seep around the piston 70 within the chamber 21. If fluid is allowed to leak around the piston this may reduce the effectiveness of the actuator assembly 80.

The seal housing 81 as illustrated in FIGS. 18A-18D and the adjustor 83 as illustrated in FIGS. 19A-19D, together, are employed to control and seal the flow of fluid into the chamber 21.

The seal housing 81 provides an orifice 4, through which the working fluid (in the form of a liquid or a gas) is pumped into the gear 1. On an internal wall of the seal housing 81 an orifice outlet 5 allows the working fluid to escape the seal housing 81 and enter the end cap fluid inlet 18 of the second end cap 22.

Three annular grooves 90, 90', 90" are formed internally of the seal housing 81. The central groove 90' receives the working fluid as it passes from orifice 4 to the orifice outlet 5 of the seal housing 81. The two adjacent grooves 90, 90" provide seats for receiving sealing members, such as O-ring, not illustrated in FIG. 18B or 18D.

An outer circumferential surface 91 of the seal housing 81 provides three circumferential lugs 92 outwardly extending therefrom. The lugs 92 are equidistantly spaced about outer surface 91 of the seal housing 81. Each of the lugs 92 is provided with a hole 93. The hole 93 provide three distinct bore diameters therethrough; a first countersunk bore 94 for receiving a head of a shoulder bolt 97; a second central bore 95 for retaining the shank of the shoulder bolt 97; and an end bore 96 for engaging a threaded end 97a of the shoulder bolt 97.

The adjustor 83 is an annular component having a screw thread 88 extending across an outer surface of the adjustor 83. Internally of the annular adjustor there is a flange 9). The flange 9 is internal to the adjustor 83 and extends circumferentially there around, located towards an end 83a of the adjustor 83. The flange 9 provides a plurality of apertures 89 that are configured to be selectively aligned with the lugs 92 when the sealing housing 81 and adjustor 82 are brought together.

The adjustor 83 also provides an external thread 88 that threadingly mates with a co-operating thread in the left-hand axle housing (a similar thread is provided at the opposing end of the differential gear 1 (not illustrated) for engaging with the right hand axle housing.

Each of the lugs 92 is dimensioned to be received in corresponding recesses 8 of the adjustor 83 (see FIGS. 20A and 20B).

To bring the seal housing 81 and the adjustor nut 83 together, the 3 lugs 92 are aligned with the three recesses 8 in the adjustor 83 and rotated to align the apertures 89 with the holes 93 in the seal housing 81.

As the recesses 8 of the adjustor 83 are slid over the lugs 92 of the housing 81 the two components can be rotated about one another. When the desired alignment is achieved between the seal housing 81 and the adjustor 83, three shoulder bolts 97 are inserted into the hole 93 capturing the aligned apertures 89 of the adjustor and ultimately threadingly engaging with the seal housing 81 by the end bore 96 of the hole 93 (illustrated in FIG. 20C), A single bolt 97 can be used in isolation. Alternatively, two bolts 97, four bolts 97 or more than four bolts 97 can be used to secure the housing 81 and the adjustor 83.

The hole 93 provide a bore 94 for receiving and countersinking the head of the bolt 97. The central bore 95 of the hole 93 is larger than the shank of the shoulder bolt 97. As the bolt 97 is received in the threaded end bore 96 the bolt 97 it is threadingly secured into the seal housing 81 not onto the adjustor nut 83. A clearance gap is formed 98 to allow the seal housing 81 to float. The clearance is relatively small, about ±0.1 mm.

The inserted bolt 97 is tightened into the hole 93 in the lug 92 of the seal housing 81 but doesn't torque up, as recessed shoulders 99 and threaded end portion 97a prevent over tightening and thereby prevent distorting of the lugs 92 and damage to the floating seal housing 81 that could occur from over tightening. The floating aspect allows for some tolerance changes and movement over the life of the vehicle.

The apertures 89 in the adjustor 83 can also be used as receiving holes of a spanner or alternative tool for tightening and ease of removal of the adjustor 83 for servicing and access.

The only contact between the seal housing 81 and end cap 22 is via the O-rings seated in recesses 90 and 90". This provides a floating seal housing 81.

When a manufacturer installs a differential in a vehicle, an adjustor nut of some form is provided at opposing ends of the differential. The adjustor nut 83 illustrated in the accompanying FIGS. 19-21 is not a typical adjustor nut as it provides a floating adjustment to the actuator assembly 80 of the differential.

A typical nut would be used at the second end 13 of the differential 1; however, this is not illustrated in the Figures. A typical nut would be tightened with a spanner to twist the nut and set the preload on the taper roller bearings of the bearing assembly 86.

The typical nut and the adjustor 83 are located at opposing ends 12,13 of the differential 1, both of which can be tightened towards each other to seat the taper roller bearings of the bearing assemblies 86. As the adjustor nut 83 is tightened the bearings become preloaded. Additional to preloading the bearings, the differential pear 1 uses this seal housing and adjustor to move the differential gear 1 within the differential housing. To reset to the pinion and crown wheel, the adjustor nut 83 on either or both ends of the differential 1 can be tightened or loosened to shift the overlap of the gear teeth of the pinion and crown wheel. This provides a fine tuning to set the "back-lash" and the bearing preload when installing the differential gear 1.

Figure 21B:
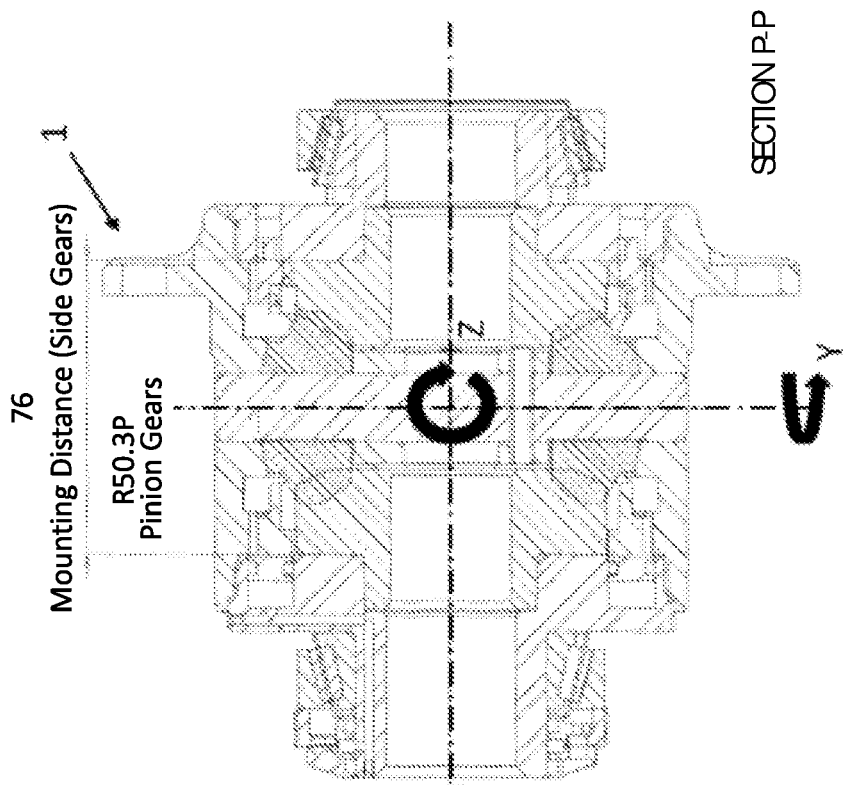
FIG. 21B is a sectional view along line P-P of FIG. 21A illustrating a rotational axis X of the differential gear and a rotational axis Y of a pair of pinion gears within the differential housing, the axis X being perpendicularly disposed relative to the axis Y.
Figure 21A:
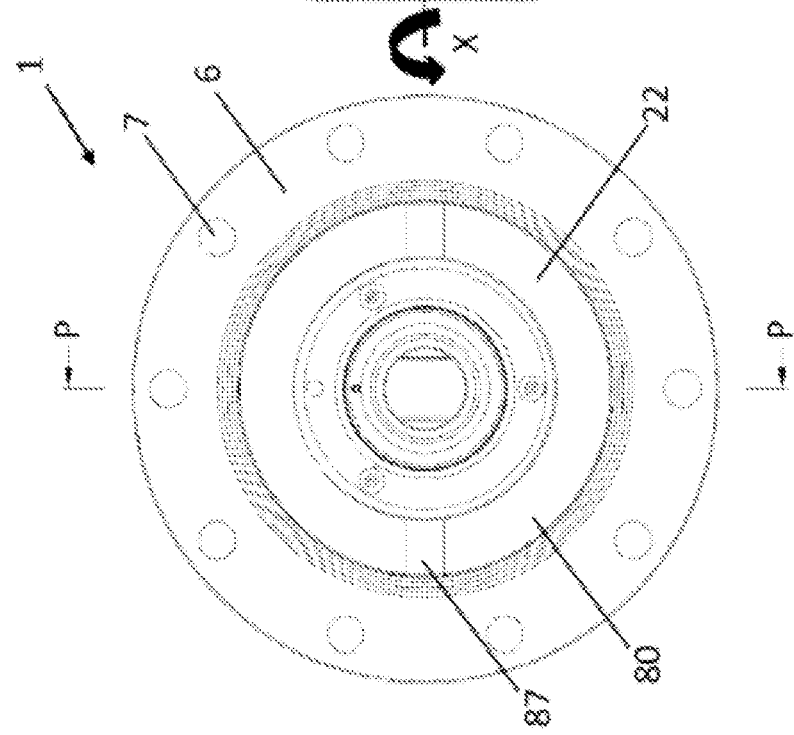
FIG. 21A is a top view of the fully assembled differential gear.

FIG. 21A illustrates an end view of the second end 13 of the fully assembled differential gear 1. In this view, the long pinion-shaft 37 can be seen through the axle aperture 27" of the second end cap 22.

FIG. 21B is a section through the differential gear 1 along line P-P of FIG. 21A. A rotational axis X is illustrative of the rotational axis of the differential gear 1 and the side bevel gears 40, 50 therein. Perpendicular to axis X is a second rotational axis Y, which defines the rotational direction of the two visible pinion gears 31,31'. An additional two pinion gears 31', not illustrated in this sectional view rotate in a third rotational axis Z, which extends from the page. The axis Z is perpendicular to each of the axes X and Y, essentially defining a three-dimensional axis system.

When the differential gear 1 is fully assembled but not connected to a pair of axles the long cross shaft 37 is visible through the journal apertures 27,27' of the end caps 20,22. In its assembled state, differential gear 1 provides mounting journals 26, 26' at both ends thereof and the mounting flange 6 for receiving a crown wheel (or ring pear) with which to connect the differential gear 1 with the drive train of the vehicle. The lubricating fluids of the differential gear 1 are entirely separated from the fluid within the actuator assembly 80 and the two do not mix or come into any contact situation, while the differential gear 1 is in use in the vehicle. FIG. 21B illustrates the close mating relationship between each of the internal components of the differential gear 1. The teeth 41, 51 of the bevel gears 40, 50 and teeth 32 of the pinion gears 31 are meshingly engaged. The tolerances required to produce the gears 40, 50, 31, locking member 60, carrier 10 and pinion assembly 30 to ensure accurate interconnection of these components is very high. As such the components can be cast/forged and thereafter machine finished to achieve the necessary dimensional accuracy. In some embodiments the gears will be heat treated and surface treated after manufacture to increase or enhance their material properties eg. hardness, toughness, surface finish, ultimate tensile strength, fatigue strength etc.

Upon assembly, the rear faces 45, 55 of the bevel gears 40, 50 are abutted to the end caps 20, 22 and are slid into place from either side of the locking member 60 thereby trapping the pinion assembly 30 therebetween. The piston 70 is positioned within the fluid chamber 21 with the outer 77 and inner 78 O-rings circumventing the piston 70 ready to be compressed into position within the first chamber 21 thereby sealing the hydraulic system within the carrier 10.

The differential gear 1 described herein is configured to receive a crown wheel on the mounting flange 6 of the carrier 10. The crown wheel and differential gear 1 assembly is engagingly connected to a prop shaft of a vehicle to drive the crown wheel and thereby drive the differential gear 1. The torque (rotational input) to the crown wheel will be evenly distributed to each of the first 40 and second 50 bevel gears, which in turn transmit their rotational movement to each of the left and right axle respectively attached thereto. The left and right axles are also connected to a left and right wheel of a vehicle wherein the traction (resistive force) on each of the wheels will influence how the torque from the prop shaft is distributed to each axle. The traction on each wheel is a function of the weight pressing down on the wheel and the frictional coefficient of the surface upon which the wheel is contacting.

As the vehicle turns a corner one of the bevel gears 40 will increase in rotational velocity and the other bevel gear 50 will decrease in rotational velocity by a proportional amount. Assuming that both wheels of the vehicle have similar traction (ie. are on similar road surfaces) the pinion gears 31 engaged between the first 40 and second 50 bevel gear will distribute torque equally between the two interconnected wheels of the vehicle, as any open differential gear set would. However, if the traction of one of the two wheels was to incrementally change (ie, one wheel travels over ice) the traction on the ice bound wheel would drop relative to the non-ice bound wheel. This difference in traction between the wheels will cause an increase in the rotational speed of the bevel gear attached to the axle of the ice-bound wheel.

In an off-roading situation, it may be desirable to lock the differential gear 1 completely. Accordingly, the actuator assembly 80 is activated to send fluid to orifice 4 effectively locking the left and the right axle together to form a closed or locked differential gear 1. The activation may be by an electronic, pneumatic or hydraulic actuator.

The fluid chamber 21 can be filled with gas. In some embodiments a gas, for example, compressed air may be preferential as there is no risk of contamination to the differential in the event of leakage. A typical compressor pressure range of 700-800 kPa is sufficient to activate the actuator assembly (or 100-120 psi).

In alternative embodiments the fluid chamber 21 is filled with a liquid. Automatic transmission fluid (ATF) is one such fluid, which provides a good hydraulic working fluid with lubricating properties and anti-wear additives. Variants of ATF are also contemplated having corrosion inhibitors and surfactants which will increase the working life of the differential gear 1 by keeping the fluid conduit 16 and chamber 21 clean.

The fluid within the fluid chamber 21 is totally sealed off from the cavity 15 of the differential to eliminate or at least reduce unwanted contamination of the fluid chamber 21, from lubricating fluids or contaminants in the differential cavity 15.

It will be appreciated by persons skilled in the art that numerous variations and modifications may be made to the above-described embodiments, without departing from the spirit and scope of the invention, particularly the invention defined in the following claims. The present embodiments are, therefore, to be considered in all respects as illustrative of the scope of protection, and not restrictively.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

LEGEND

| No. | |
|---|---|
| 1 | Differential gear |
| 2 | #1 Splines |
| 3 | #2 Splines |
| 4 | Orifice |
| 5 | Orifice outlet |
| 6 | Crown wheel mtng flng |
| 7 | C-wheel bolt mntg hole |
| 8 | Recesses |
| 9 | Flange of the adjustor |
| 10 | Carrier |
| 11 | Side wall 11a/11b |
| 12 | First end (flange end) |
| 13 | Second end (cylinder end) |
| 14 | Mating thread |
| 15 | Cavity |
| 16 | Fluid conduit |
| 17 | Inlet to fluid chamber |
| 18 | Inlet to End cap |
| 19 | Lubricating apertures |
| 20 | End Cap (flange end) |
| 21 | Fluid chamber |
| 22 | End cap (cylinder end) |
| 23 | Side portion of end cap |
| 24 | Spring recess |
| 25 | Apertures of first end cap |
| 26 | Mounting journal |
| 27 | Journal aperture |
| 29 | Screw thread |
| 30 | Pinion assembly |
| 31 | Pinion gear |
| 32 | Pinion gear bevel teeth |
| 33 | Pinion gear front face |
| 34 | Pinion gear rear face |
| 35 | Central bore |
| 36 | Pinion block |
| 36a | Pinion block apertures |
| 37 | Long pinion-shaft |
| 37a | First end |
| 37b | Second end |
| 38 | Short pinion-shaft |
| 39 | retaining pin hole |
| 40 | First Side Bevel Gear |
| 41 | Spur teeth |
| 42 | Outer surface |
| 43 | Bevel gear front face |
| 44 | Peripheral skirt |
| 45 | Bevel gear rear face |
| 47 | Bevel teeth |
| 48 | Axle mounting collar |
| 49 | Axle aperture |
| 50 | #2 Side Bevel Gear |
| 51 | Spur teeth |
| 52 | Outer surface |
| 53 | Bevel gear front face |
| 54 | Peripheral skirt |
| 55 | Bevel gear rear face |
| 56 | Second op surface |
| 57 | Bevel teeth |
| 58 | Axle mounting collar |
| 59 | Axle aperture |
| 60 | Locking member |
| 61 | First end |
| 62 | Second end |
| 63 | First external teeth |
| 64 | Second external teeth |
| 65 | Side wall of locking member |
| 65a | Outer surfaces |
| 62 | Second end |
| 63 | First external teeth |
| 64 | Second external teeth |
| 65 | Side wall of locking member |
| 65a | Outer surfaces |
| 66 | Clutch Sleeve |
| 67 | Pinion Clearance Hole |
| 67a | Pinion Ap side walls |
| 68 | #1 internal teeth |
| 69 | #2 Internal teeth |
| 70 | Piston |
| 71 | First Reaction Surface |
| 72 | Second Reaction Surface |
| 73 | Outer H-Shaped cross-section |

-continued

| No. | |
|---|---|
| 74 | H-Shaped x-section |
| 76 | Clutch Ring |
| 77 | Outer O-ring |
| 78 | Inner O-ring |
| 79 | Clutch ring leading edge |
| 80 | Actuator assembly |
| 81 | Seal Housing |
| 82 | Biasing Member |
| 83 | Adjuster Nut |
| 84 | Clutch sleeve seal seat |
| 85 | Clutch Ring projection |
| 86 | Bearing Assembly |
| 87 | Slotted Recess |
| 88 | Adjuster nut thread |
| 89 | Adjuster nut apertures |
| 90 | Annular grooves |
| 91 | Seal housing perimeter |
| 92 | Slot |
| 93 | Bolt Hole |
| 94 | Head bore |
| 95 | Central bore |
| 96 | Threaded end bore |
| 97 | Shoulder bolt |
| 98 | Clearance gap |
| 99 | Recessed shoulders |
| Z1 | First contact zone |
| Y | Rotational axis of the pinion gears |
| S | Stroke of actuator |
| X | Rotational axis of the differential gear |

The invention claimed is:

1. A locking differential, comprising;
a pair of rotating bevel gears engaged with one another via at least one pinion gear rotatably supported within a carrier;
a locking member disposed within the carrier and engagable with each of the pair of rotating bevel gears, the locking member being movable between a locked configuration and an unlocked configuration, such that in the unlocked configuration the locking member allows free rotation of the pair of rotating bevel gears in engagement with the at least one pinion gear to equalize torque between a first rotating bevel gear of the pair of rotating bevel gears and a second rotating bevel gear of the pair of rotating bevel gears, and in the locked configuration the locking member locks the first rotating bevel gear to the carrier and locks the second rotating bevel gear to the carrier, simultaneously, to prevent relative movement therebetween, wherein the locked configuration places the locking member in physical engagement between the first rotating bevel gear and the carrier and in physical engagement between the second rotating bevel gear and the carrier.

2. The locking differential of claim 1, wherein the carrier provides a central cavity for accommodating the pair of rotating bevel gears and the at least one pinion gear.

3. The locking differential of claim 1, further comprising an actuator selectively engagable to drive the locking member between the locked and the unlocked configuration.

4. The locking differential of claim 3, wherein the actuator comprises a movable piston, in proximity to a sleeve of the locking member.

5. The locking differential of claim 4, wherein the actuator further comprises a hydraulic or pneumatic system for moving the piston within a chamber to thereby drive movement of the sleeve.

6. The locking differential of claim 5, further comprising a sealing assembly for fluidly sealing the chamber in which the piston resides.

7. A locking differential, comprising;
a pair of rotating bevel gears engaged with one another via at least one pinion gear rotatably supported within a carrier;
a locking member disposed within the carrier and engagable with each of the pair of rotating bevel gears, the locking member being movable between a locked configuration and an unlocked configuration, such that in the unlocked configuration the locking member allows free rotation of the pair of rotating bevel gears in engagement with the at least one pinion gear to equalize torque between a first rotating bevel gear of the pair of rotating bevel gears and a second rotating bevel gear of the pair of rotating bevel gears, and in the locked configuration the locking member locks the first rotating bevel gear to the carrier and locks the second rotating bevel gear to the carrier, simultaneously, to prevent relative movement therebetween, wherein the locking member comprises a movable sleeve that internally encircles the carrier.

8. The locking differential of claim 7, wherein the movable sleeve comprises a ring of external teeth at each of a first end and a second end thereof.

9. The locking differential of claim 8, wherein the movable sleeve further comprises a ring of internal teeth at each of the first end and the second end thereof.

10. The locking differential of claim 9, wherein an internal surface of the carrier provides a ring of splines for cooperating with the movable sleeve therein.

11. The locking differential of claim 10, wherein each of the first rotating bevel gear and the second rotating bevel gear comprises a ring of external spur teeth for cooperative engagement with the respective rings of the internal teeth at the first end and the second end of the movable sleeve.

12. The locking differential of claim 11, wherein individual teeth of the rings of external spur teeth protrude outwardly from a circumferential surface of each of the first rotating bevel gear and the second rotating bevel gear.

13. The locking differential of claim 7, wherein the movable sleeve comprises a clutch sleeve and a clutch ring:
the clutch sleeve supporting a first ring of external teeth and a first ring of internal teeth at a first end of the movable sleeve; and
the clutch ring supporting a second ring of external teeth and a second ring of internal teeth at a second end of the movable sleeve.

14. The locking differential of claim 13, wherein the first ring of external teeth of the clutch sleeve and the second ring of external teeth of the clutch ring are configured to move along splines of a cavity of the carrier, thereby engaging the first internal teeth of the clutch sleeve and the second internal teeth of the clutch ring with spur teeth of each of the pair of rotating bevel gears, to lock the locking differential.

15. The locking differential of claim 13, wherein the first ring of external teeth of the clutch sleeve and the second ring of external teeth of the clutch ring are configured to move along splines of a cavity of the carrier, thereby disengaging the first internal teeth of the clutch sleeve and the second internal teeth of the clutch ring with spur teeth of each of the pair of rotating bevel gears, to un-lock the locking differential.

16. A locking differential, comprising;
a pair of rotating bevel gears engaged with one another via at least one pinion gear rotatably supported within a carrier;
a locking member disposed within the carrier and engagable with each of the pair of rotating bevel gears, the locking member being movable between a locked configuration and an unlocked configuration, such that in the unlocked configuration the locking member allows free rotation of the pair of rotating bevel gears in engagement with the at least one pinion gear to equalize torque between a first rotating bevel gear of the pair of rotating bevel gears and a second rotating bevel gear of the pair of rotating bevel gears, and in the locked configuration the locking member locks the first rotating bevel gear to the carrier and locks the second rotating bevel gear to the carrier, simultaneously, to prevent relative movement therebetween, wherein the carrier provides a central cavity for accommodating the pair of rotating bevel gears and the at least one pinion gear, and wherein the carrier provides a central cavity for accommodating the pair of rotating bevel gears and the at least one pinion gear; and
a pair of end caps for sealing the central cavity of the carrier, wherein at least one of the end caps is threadingly engageable with the carrier.

17. A differential for a motor vehicle, the differential comprising:
a locking differential comprising:
a pair of rotating bevel gears engaged with one another via at least one pinion gear rotatably supported within a carrier;
a locking member disposed within the carrier and engagable with each of the pair of rotating bevel gears, the locking member being movable between a locked configuration and an unlocked configuration, such that in the unlocked configuration the locking member allows free rotation of the pair of rotating bevel gears in engagement with the at least one pinion gear to equalize torque between a first rotating bevel gear of the pair of rotating bevel gears and a second rotating bevel gear of the pair of rotating bevel gears, and in the locked configuration the locking member locks the first rotating bevel gear to the carrier and locks the second rotating bevel gear to the carrier, simultaneously, to prevent relative movement therebetween, wherein the locked configuration places the locking member in physical engagement between the first rotating bevel gear and the carrier and in physical engagement between the second rotating bevel gear and the carrier,
the locking differential comprising an external gear disposed around the carrier, wherein the locking differential and external gear are housed within a differential housing, the external gear being configured to cooperate with a drive of the motor vehicle, and the pair of bevel gears configured to distribute torque between a first output shaft and a second output shaft.

18. A method of locking a locking differential, the method comprising:
actuating a fluid supply to pressurize a chamber within a carrier of a differential; and
moving an actuator disposed at least partially within the chamber relative to the carrier to drive a locking member into simultaneous engagement with each of a first bevel gear, a second bevel gear, and the carrier to thereby prevent relative movement therebetween.

19. The method of claim 18, wherein the first bevel gear and the second bevel gear provide a series of external spur teeth, and the carrier provides a series of internal splines, and the locking member provides a plurality of internal teeth and external teeth, such that moving the locking member within the carrier drives the external teeth of the locking member along the internal splines of the carrier and simultaneously drives the internal teeth of the locking member into engagement with the spur teeth of each of the first bevel gear and the second bevel gear, thereby locking the differential.

\* \* \* \* \*